(12) United States Patent
Pauli et al.

(10) Patent No.: US 6,226,515 B1
(45) Date of Patent: May 1, 2001

(54) CELLULAR CORDLESS TELECOMMUNICATIONS SYSTEM

(75) Inventors: Burkhard Pauli, Dorsten; Ralf Neuhaus, Lünen; Hans-Dieter Ide, Dortmund; Horst Flake, Oberhaching; Otger Wewers, Bocholt, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/952,608

(22) PCT Filed: May 29, 1996

(86) PCT No.: PCT/DE96/00933

§ 371 Date: Nov. 19, 1997

§ 102(e) Date: Nov. 19, 1997

(87) PCT Pub. No.: WO96/38990

PCT Pub. Date: Dec. 5, 1996

(30) Foreign Application Priority Data

May 31, 1995 (DE) ............................................. 195 19 966

(51) Int. Cl.[7] .............................. H04Q 7/20; H04Q 7/22; H04Q 7/24

(52) U.S. Cl. .......................... 455/426; 455/560; 455/561; 455/462; 455/554; 455/555; 455/502; 370/350; 370/524; 370/329

(58) Field of Search ..................................... 455/426, 560, 455/554, 555, 445, 462, 502, 501, 517, 524, 550; 370/350, 328, 329, 524

(56) References Cited

U.S. PATENT DOCUMENTS

| 5,309,440 | 5/1994 | Nakamura et al. | 455/426 |
|---|---|---|---|
| 5,327,433 | 7/1994 | Hall | 455/426 |
| 5,388,102 | 2/1995 | Griffith et al. | 455/426 |
| 5,398,249 | 3/1995 | Chen et al. | 455/426 |
| 5,544,226 | * 8/1996 | Weis et al. | 455/426 |

FOREIGN PATENT DOCUMENTS

| 0 624 995 | 11/1994 | (EP) . |
|---|---|---|
| WO 94/18764 | 8/1994 | (WO) . |
| WO 95/01071 | 5/1995 | (WO) . |

OTHER PUBLICATIONS

Nachrichtentechnik Elektronik 42 (Jan./Feb. 1992), No. 1, Berlin, Ulrich Pilger, Struktur des DECT–Standards, pp. 23–29.

Siemens Components 31, (1993) No. 6, Stephan Althammer et al, Hochoptimierte ICs für DECT–Schnurlos–telefone, pp. 215–218.

Telcom Report 16, (1993) No. 1, J.H. Koch, Digitaler Komfort für schnurlose Telekommunikation—DECT Standard offnet neue Nutzungsgebiete, pp. 26–27.

Druckschrift TIB–RO9067(5) P. Bauer Trocheris: UMTS–Integrator für die mobile Kommunkation –ein Ausblick auf die Mobilfunklandschaft nach dem Jahr 2000, Bericht über die Tagung, Europäischer Mobilfunk 5, Jahrestreffen der deutschen und europäischen Mobilfunkbranche, FIBA–Kongresse, München, Feb. 24–26, 1993, pp. 1013–1026.

(List continued on next page.)

Primary Examiner—Fan Tsang
Assistant Examiner—Keith Ferguson
(74) Attorney, Agent, or Firm—Schiff, Hardin & Waite

(57) ABSTRACT

In order to design a cellular cordless telecommunications system which makes it possible to implement a large number of performance features, for example synchronization, roaming, handover, internal links, hold, check-back, transfer etc. in the cellular cordless telecommunications system without any additional wire link between the cordless base stations in the cellular cordless telecommunications system, the cordless base stations are connected to an $S_0$ bus (i.e., a basic access line for a multi-device configured system).

42 Claims, 11 Drawing Sheets

OTHER PUBLICATIONS

Tec 2/93, Das Technische Magazine von Ascom, Wege zur universellen mobilen Telekommunkation, pp. 35–42.

Unterrichtsblätter—Deutsche Telekom Jg. 48, Feb. 1995, Protokolle am Beispiel des OSI–Referenzmodells, pp. 102–111.

* cited by examiner

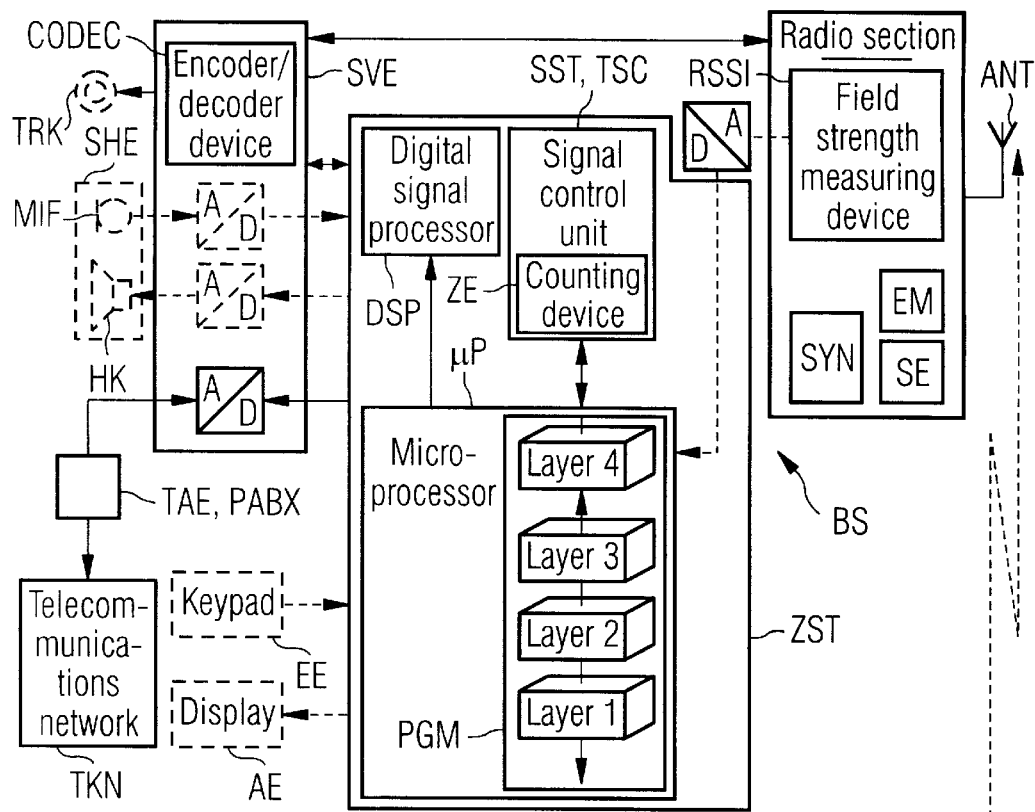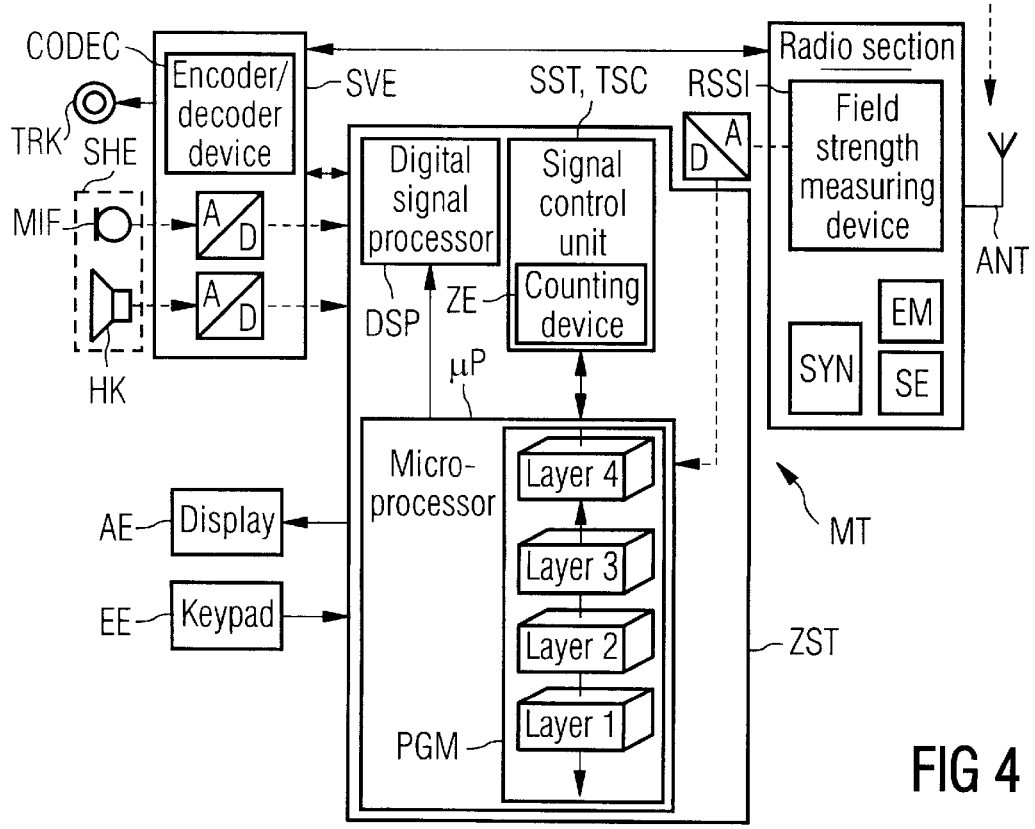
FIG 4

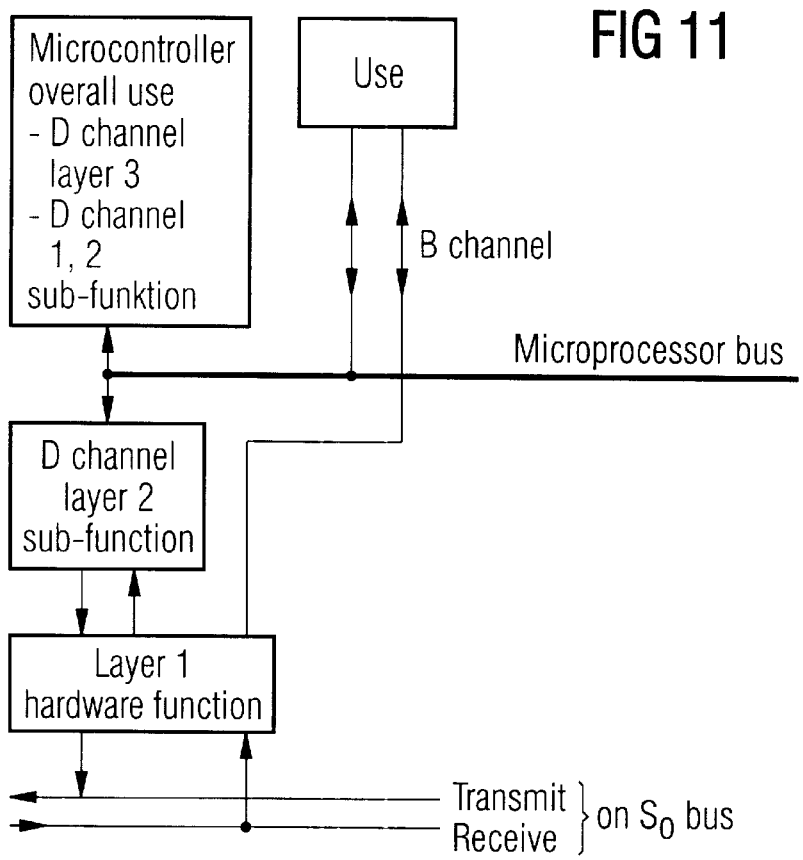
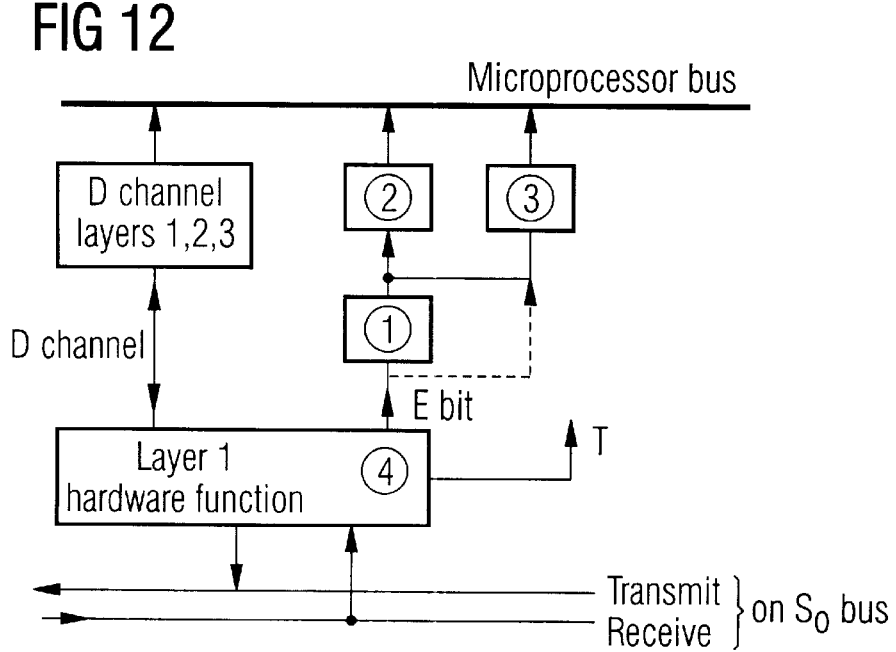

CELLULAR CORDLESS TELECOMMUNICATIONS SYSTEM

BACKGROUND OF THE INVENTION

The invention relates to a cellular cordless telecommunications system.

The cordless telecommunications system with the best performance of the moment, based on the DECT Standard [Digital Enhanced (previously: European) Cordless Telecommunications; cf. Nachrichtentechnik Elektronik [Electronic Information Technology] 42 (January/February 1992), No. 1, Berlin; U. Pilger: <sup>33</sup> "Struktur des DECT-Standards" [Structure of the DECT Standard]; pages 23 to 29 in conjunction with the ETSI Publication ETS 300175-1 . . . 9, October 1992; Siemens Components 31 (1993), No. 6; S. Althammer and D. Brückmann: "Hochoptimierte IC's für DECT-Schnurlostelefone [Highly optimized ICs for DECT cordless telephones]", pages 215 to 218; telecom report 16 (1993), No. 1, J. H. Koch: "Digitaler Komfort für schnurlose Telekommunikation—DECT-Standard eröffnet neue Nutzungssgebiete [Digital convenience for cordless telecommunications—DECT Standard opens up new fields of use]", pages 26 and 27), transmits the radio messages, inter alia, using the TDMA method (Time Division Multiple Access).

However, the present invention is not limited to the TDMA transmission method. The invention thus also extends to those systems which are described in the document TIB-RO9067(5)-P. Bauer-Trocheris: "UMTS-Integrator für die mobile Kommunikation—ein Ausblick auf die Mobilfunklandschaft nach dem Jahr 2000 [UMTS integrator for mobile communications—a summary of the mobile radio situation after the year 2000]", Report on the Convention "European Mobile Radio, 5th annual meeting of the German and European mobile radio section, FIBA Congress, Munich, Feb. 24 to 26, 1993".

The DECT-specific cordless telephone system is a digital system which, according to FIG. 1 (cf. tec 2/93— Technical Magazine from Ascom "Wege zur universellen mobilen Telekommunikation [Ways for universal mobile telephone communication]", pages 35 to 42) can be used in the private area (for example house, apartment, garden etc.), in the small public area (for example companies, office building etc.) and as a telepoint application.

The basic structure of the cordless telephone system comprises a base station BS (FP=Fixed Part with FT=Fixed Termination and a mobile unit MT (PP=Portable Part with PT=Portable Termination with the capability for telecommunications with the base station BS. This basic structure can be extended in accordance with the DECT Standard in such a manner that up to twelve such mobile units MT are assigned to a single base station BS.

FIG. 2 shows such a cordless telephone system STS, in which a maximum of 12 links using the TDMA/FDMA/TDD method (Time Division Multiple Access/Frequency Division Multiple Access/Time Division Duplex) are set up on one DECT base station BS in parallel to DECT mobile units MT1 . . . MT12 via a DECT radio interface designed for the frequency band between 1.88 and 1.90 GHz. The FIG. 12 results from a number "k" of time slots or telecommunications channels (k=12) available for duplex operation of a DECT system. The links may in this case be internal and/or external. In the case of an internal link, two mobile units registered at the base station BS, for example the mobile unit MT2 and the mobile unit MT3, can communicate with one another. For setting up an external link, the base station BS is connected to a telecommunications network TKN, for example in wire-based form via a telecommunications access unit TAE or a private branch exchange NStA is connected to a wire-based telecommunications network or, in accordance with WO 95/05040, in wire-free form as a repeater station to a higher level telecommunications network. In the case of the external link, it is possible to communicate with a mobile unit, for example with the mobile unit MT1, via the base station BS, and for the telecommunications access unit TAE and a private branch exchange NStA to communicate with a subscriber in the telecommunications network TKN. If, as in the case of the Gigaset 951 (Siemens cordless telephone, cf. telecom report 16, (1993), issue 1, pages 26 and 27—the base station BS has only one connection to the telecommunications access unit TAE or the private branch exchange NStA, then only one external link can be set up. If—as in the case of the Gigaset 952 (Siemens cordless telephone, cf. telecom report 16, (1993), issue 1, pages 26 and 27—the base station BS has two connections to the telecommunications network TKN, then, in addition to the external link to the mobile unit MT1, a further external link is possible from a wire-based telecommunications terminal TKE connected to the base station BS. In this case, it is in principle also feasible for a second mobile unit, for example the mobile unit MT12, to use the second connection for an external link, instead of the telecommunications terminal TKE. While the mobile units MT1 . . . MT12 are operated using a battery or a rechargeable battery, base station BS, which is designed as a small cordless switching system, is connected via a mains connecting unit NAG to a power network SPN.

The cordless telephone system according to FIG. 2 is preferably used in the private area, according to FIG. 1.

In the small public area—in accordance with FIG. 1—a plurality of such cordless telephone systems according to FIG. 2 can be operated in a cellular system on a private branch exchange (Private Automatic Branch Exchange), the private branch exchange PABX controlling a plurality of base stations A-BS, B-BS, C-BS and, if required, supporting a handover from one base station to another. FIG. 1 also shows six mobile units $MT_a$ . . . $MT_f$ which are assigned to the three base stations A-BS, B-BS, C-BS. This results in a cellular cordless telephone system in which the telecommunications link as a rule passes via that base station A-BS, B-BS, C-BS with which the mobile unit $MT_a$ . . . $MT_f$ has the best radio contact.

Based on the document "Nachrichtentechnik Elektronik [Electronic Information Technology]"42 (1992) January/February, No. 1, Berlin, DE; U. Pilger: "Struktur des DECT-Standards [Structure of the DECT Standard]", pages 23 to 29 in conjunction with the ETS Publication ETS 300175-1 . . . 9, October 1992, FIG. 3 shows the TDMA structure of the DECT system STS. In terms of multiple access methods, the DECT system is a hybrid system in which radio messages can be transmitted on ten frequencies in the frequency band between 1.88 and 1.90 GHz using the FDMA principle and, according to FIG. 3, in a predetermined time sequence using the TDMA principle, from the base station BS to the mobile unit MT and from the mobile unit MT to the base station BS (duplex operation). The time sequence is in this case governed by a multiple time frame MZR, which occurs every 16 ms and which has 16 time frames ZR, each having a time duration of 10 ms. Information is transmitted separately in these time frames ZR to the base station BS and to the mobile unit MT, this information relating to a C, M, N, P and Q channel defined in the DECT Standard. If information for a number of these channels is transmitted in one time frame ZR, then the transmission takes place based on a priority list where M>C>N and P>N. Each of the 16 time frames ZR in the multiple time frame MZR is in turn split into 24 time slots ZS each having a time duration of 417 µs, of which 12 time slots ZS (time slots 0 . . . 11) are reserved for the transmission direction "base station BS→mobile unit MT" and a further 12 time slots ZS (time slots 12 . . . 23) are reserved for the transmission direction "mobile unit MT→base station BS". Information having a bit length of 480 bits is transmitted in each of these time slots ZS, in accordance with the DECT Standard. Of these 480 bits, 32 bits are transmitted as synchronization information in a SYNC field, and 388 bits as wanted information in a D field. The remaining 60 bits are transmitted as additional information in a Z field and as guard information in a "Guard Time" field. The 388 bits in the D field transmitted as wanted information are in turn split into a 64-bit long A field, a 320-bit long B field and a 4-bit long "X-CRC" word. The 64-bit long A field is composed of an 8-bit long data header, a 40-bit long data set with data for the C, Q, M, N and P channels and a 16-bit long "A-CRC" word.

Based on the document Siemens Components 31 (1993), Issue 6, pages 215 to 218; S. Althammer, D. Brückmann: "Hochoptimierte IC's für DECT-Schnurlostelefone [Highly optimized ICs for DECT cordless telephones]", FIG. 4 shows the basic circuit layout of the base station BS and of the mobile unit MT. According to this, the base station BS and the mobile unit MT have a radio section FKT with an antenna ANT which is associated with transmission and reception of radio signals, a signal processing device SVE and a central controller ZST, these items being linked to one another in the manner illustrated. The radio section FKT essentially contains known devices such as the transmitter SE, receiver EM and synthesizer SYN as well as a field strength measuring device RSSI (Radio Signal Strength Indicator, which are linked with one another in a known manner. The signal processing device SVE contains, inter alia, an encoder/decoder device CODEC. The central controller ZST has a microprocessor µP both for the base station BS and for the mobile unit MT, with a program module PGM designed in accordance with the OSI/ISO (International Organization of Standardization/Open Standardization/Open System Interconnection) layer model (cf. Information leaflets—Deutsche Telekom year 48, 2/1995, pages 102 to 11 ETSI Publication ETS 300175-1 . . . 9, October 1992), a signal control section SST and a digital signal processor DSP, which are linked to one another in the manner illustrated. Of the layers defined in the layer model only the first four layers, which are absolutely essential for the base station BS and the mobile unit MT are illustrated. The signal control section SST in the base station BS is designed as a Time Switch Controller TSC, and that in the mobile unit MT is designed as a Burst Mode Controller BMC. The major difference between the two signal control sections TSC, BMC is that the base-station-specific signal control section TSC also carries out switching functions (switch functions) in comparison with the mobile-unit-specific signal control section BMC. The signal control sections TSC, BMC each contain a counting device ZE with a bit, time slot and time frame counter.

The basic method of operation of the circuit units mentioned above is described, for example, in the document cited above, Siemens Components 31 (1993), Issue 6, pages 215 to 218.

The described circuit layout according to FIG. 4 in the base station BS and the mobile unit MT is supplemented by additional functional units in accordance with their function in the DECT system according to FIG. 2.

The base station BS is connected to the telecommunications network TKN via the signal processing device SVE and the telecommunications access unit TAE or the private branch exchange PABX. As an option, the base station BS may also have an operator interface (functional units shown by dashed lines in FIG. 4), which comprises, for example, an input device EE designed as a keypad, an indicating device AE designed as a display, a speech/listening device SHE designed as a handset with microphone MIF and an earpiece HK, as well as a ringer bell TRK.

The mobile unit MT has the operator interface (which is possible as an option for the base station BS) with the control elements which are part of this operator interface and are described above.

Like the base station BS in the private area, the private branch exchange PABX according to FIG. 1 is connected to the wire-based public telephone network PSTN (Public Switched Telephone Network). In this way, anyone can become his own network operator by obtaining a cordless telecommunications system comprising the private branch exchange PABX and the cordless telephones A-BS, B-BS, C-BS, $MT_a$ . . . $MT_f$ connected to it. EP-0466736 B1 discloses a cordless telephone system having a private branch exchange in which the private branch exchange performance features are used to set up a cellular cordless telecommunications system.

In order to allow network coordination of cordless telephones according to FIG. 1 to be dispensed with, the Dynamic Channel Allocation method (DCA method) is provided in accordance with the DECT Standard. If, for example, a DECT link is being set up, a search is carried out for that frequency and that time window having the least interference. The level (intensity) of the interference depends primarily on whether (a) a conversation is already being carried out on another base station, or (b) as a result of movement, a mobile unit comes into visual contact with a base station that was previously screened.

Any increase in interference resulting from this can be countered using the TDMA transmission method on which the DECT cordless telephone system is based. According to the TDMA method, only one time slot is used for the actual transmission; the other eleven time slots can be used for measurements. In consequence, it is possible to determine an alternative frequency/time slot pair, to which the link can be switched. This is done in the course of adaptive channel application in accordance with the DECT Standard (cf. Nachrichtentechnik Elektronik [Electronic Information Technology] 42 (January/February 1992), No. 1, Berlin; U. Pilger: "Struktur des DECT-Standards [Structure of the DECT Standard]"; page 28, paragraph 3.2.6) by means of a "Connection Handover" (Intra-Cell Handover).

In addition to this "Intra-Cell Handover", the "Inter-Cell Handover" or the seamless handover may be mentioned, which is likewise possible in the course of DECT-specific adaptive canal allocation.

In order now to address in particular the "Inter-Cell Handover" problem which occurs regularly in cellular wire-free telecommunications systems, the mobile radio receiver (mobile unit) provided for such cellular radio telecommunications systems, must be able to change the base station, subject to a cell change within the cellular radio system, at any time during an active telecommunications link to a (quasi-) stationary radio transmitter (base station), (setting up a telecommunications link to another base station) while, at the same time, passing on the already existing active telecommunications link without any interruption (seamlessly) to the other base station (seamless handover).

According to the document Nachrichtentechnik Electronik [Electronic Information Technology]" 42 (January/February 1992) No. 1, Berlin; U. Pilger: "Struktur des DECT-Standards [Structure of the DECT Standard]"; page 28, paragraph 3.2.6, the DECT Standard provides for this purpose that the mobile unit autonomously sets up a second telecommunications link, in parallel with the existing link, in the event of any deterioration in the transmission quality of the existing telecommunications link, on the basis of indicators of the transmission quality (for example signal field strength, CRC values, etc.). In the case of this "Inter-Cell Handover" procedure, the fact that DECT mobile units are continuously informed of the status of the channels available in the current environment in the course of the dynamic, decentralized channel allocation process (DCA method), is used in such a manner that the second link is set up on the basis of the entry in a channel list.

An interruption-free handover is possible using the above procedure only if the mobile unit is located in a cellular radio system with synchronized base stations. In such a synchronous cellular radio system, the mobile unit can then, in addition to the already existing telecommunications link to a base station (original base station), set up at least one further link to another base station in another radio cell without losing the synchronism with the original base station in the process. Such a synchronous cellular radio system can, however, be implemented only with considerable system complexity (cable or radio synchronization).

U.S. Pat. No. 5,388,102 discloses an arrangement for synchronization of a large number of base stations in a wire-free telecommunications system, these base stations being connected to a switching center via ISDN basic accesses. With regard to the handover problems in wire-free telecommunications systems, it is expedient if the base stations arranged in the telecommunications system are synchronized to one another. In order to synchronize the base stations, a synchronization signal (synchronization message) is therefore transmitted from the switching center to the individual base stations in the course of a communication protocol which takes place between the switching center and the base stations. Where ISDN basic access that is used in the known arrangement is used as the transmission medium between the switching center and the base stations, the S bit or M bit in the ISDN data structure is used, for example, as the carrier for the synchronization signal.

European Reference 0 529 359 A2 discloses a private branch exchange having an integrated mobile unit, by means of which cordless terminals which can be operated via base stations can be controlled. For this purpose, the private branch exchange has freely configurable interface modules. A central control unit is provided for controlling all the switching and performance feature control tasks, and a lower-level control unit is provided for controlling the setting up and clearing of links between the cordless terminals. The control units and the interface modules are connected to one another via a BUS system. With the known private branch exchange, it is furthermore possible to access and cordless terminal anywhere within the radio range of the base stations and to pass on the existing link, controlled by the lower-level control unit, when the radio area of the cordless terminal changes from one base station to another base station.

SUMMARY OF THE INVENTION

The object which the invention is based is to set up a cellular cordless telecommunications system which makes it possible to implement a large number of performance features, for example synchronication, roaming, handover, internal links, hold, check-back, transfer etc. in the cellular cordless telecommunications system without any additional wire link between the cordless base stations in the cellular cordless telecommunications system.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 4 depicts a basic circuit layout of a base station and a mobile unit;

FIG. 11 depicts one connection of the base stations to the bus;

FIG. 12 depicts another connection of the base stations to the bus;

DESCRIPTION OF THE PREFERRED EMBODIMENTS

Figure 1:
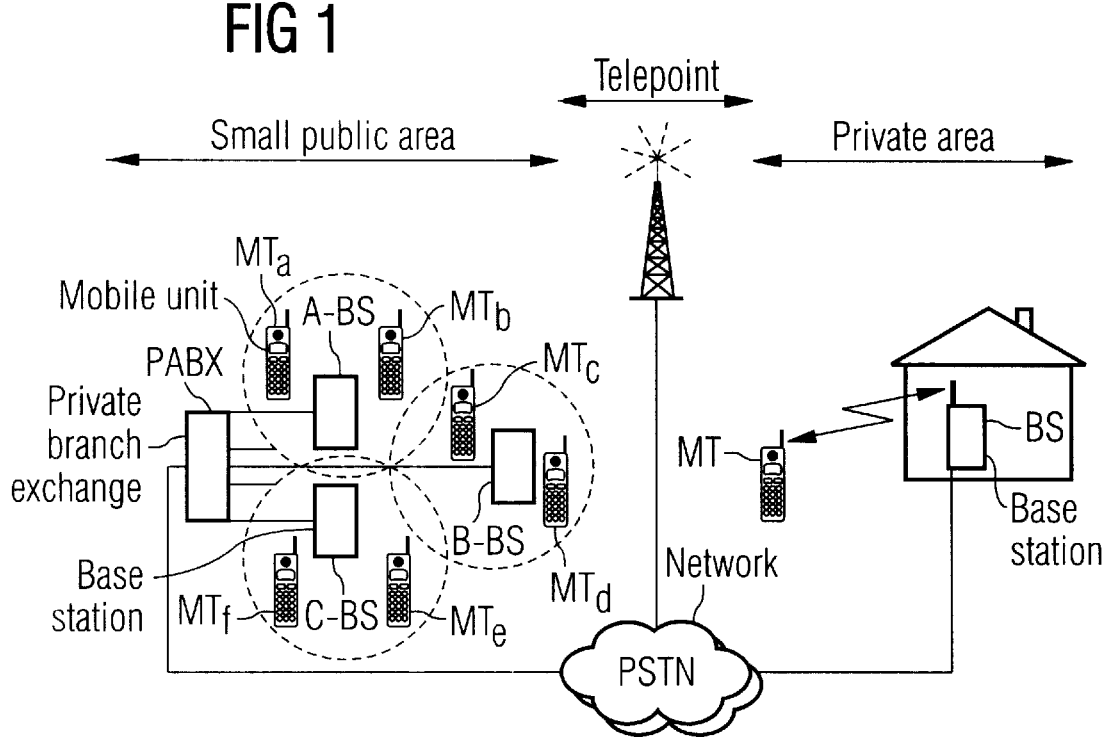
FIG. 1 depicts a DECT-specific cordless telephone system.
Figure 2:
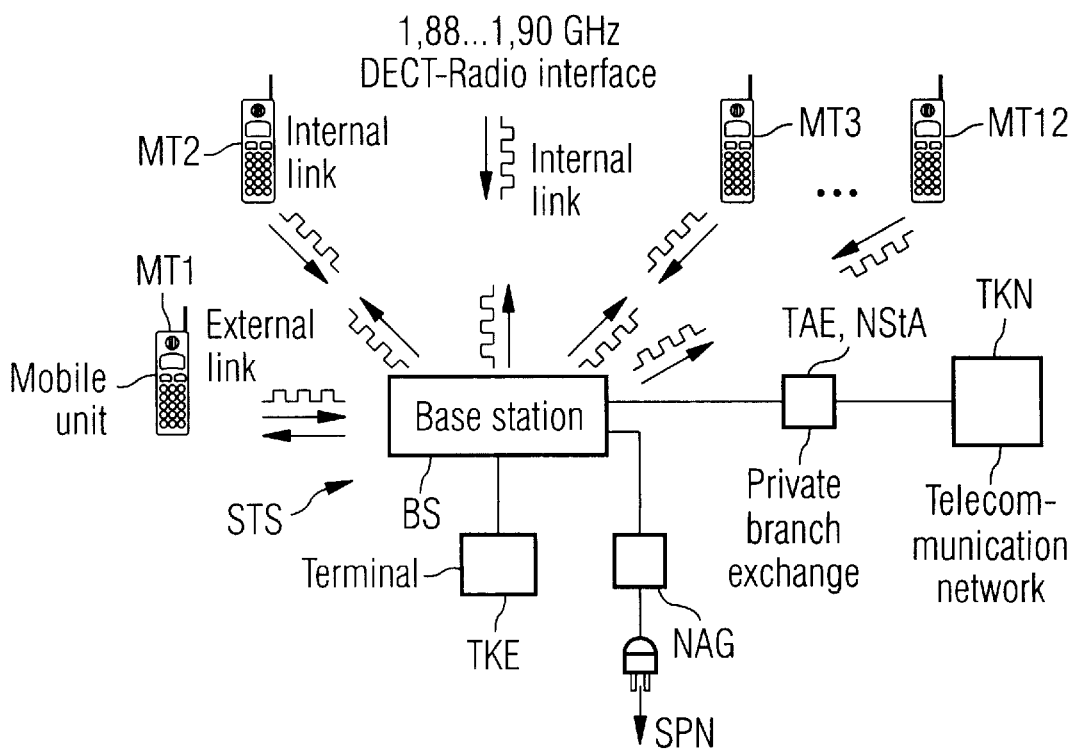
FIG. 2 depicts a plurality of cordless telephone systems operated in a cellular system on private branch exchange.
Figure 3:
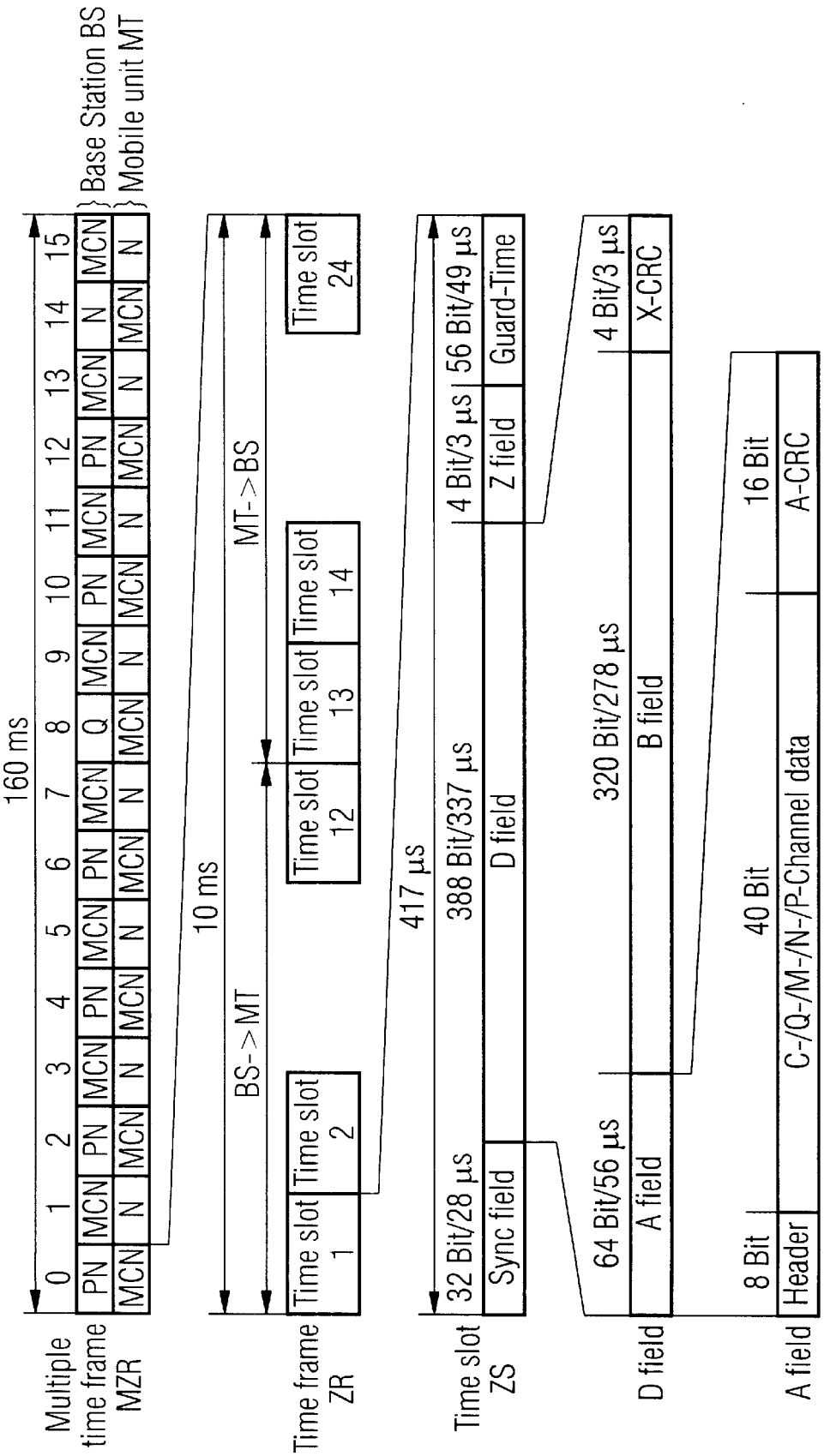
FIG. 3 depicts the FDMA principle in a predetermined timed sequence using the TDMA principle.
Figure 5:
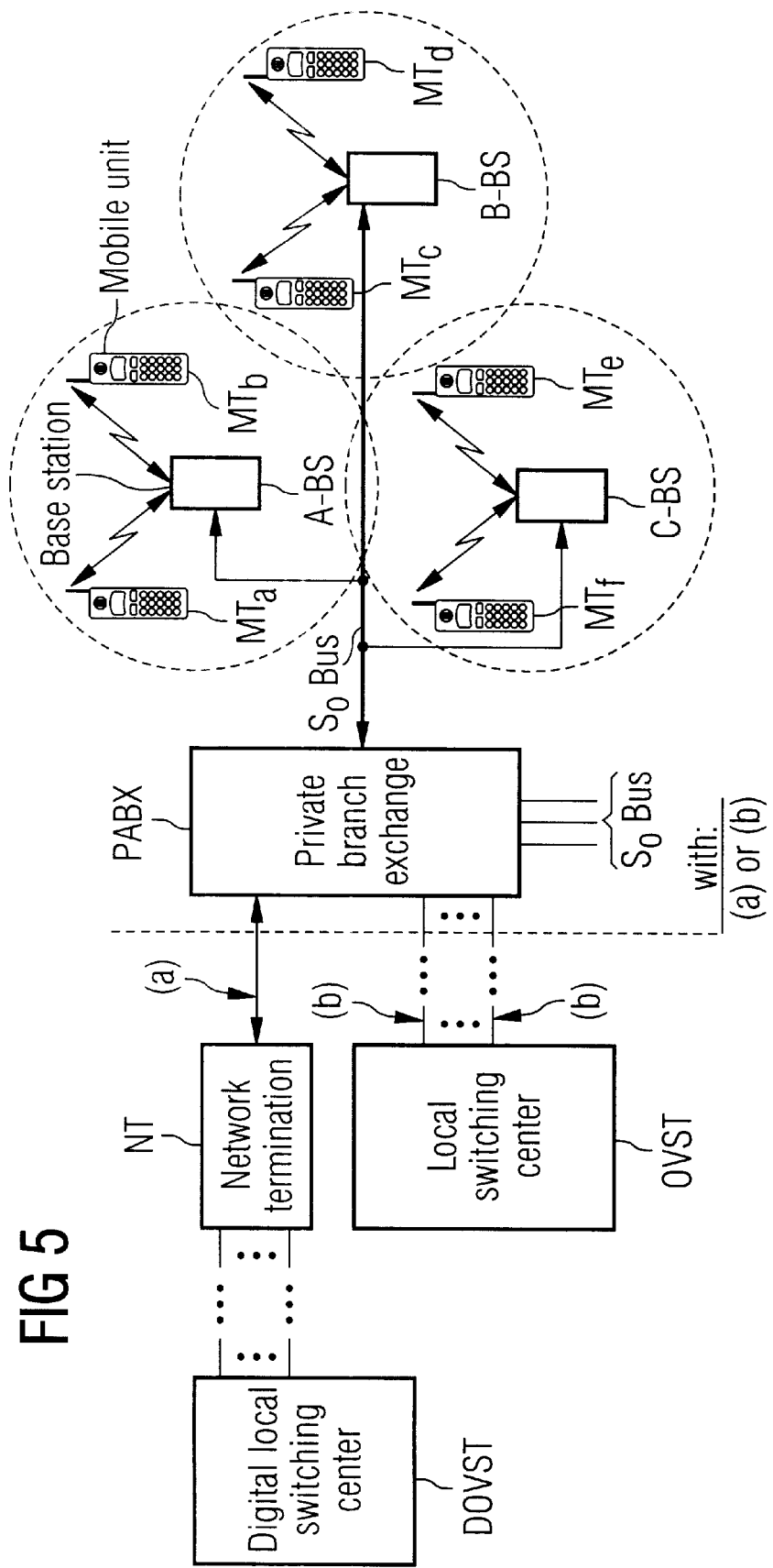
FIG. 5 depicts a simple multicell solution according to the present invention.
Figure 6:
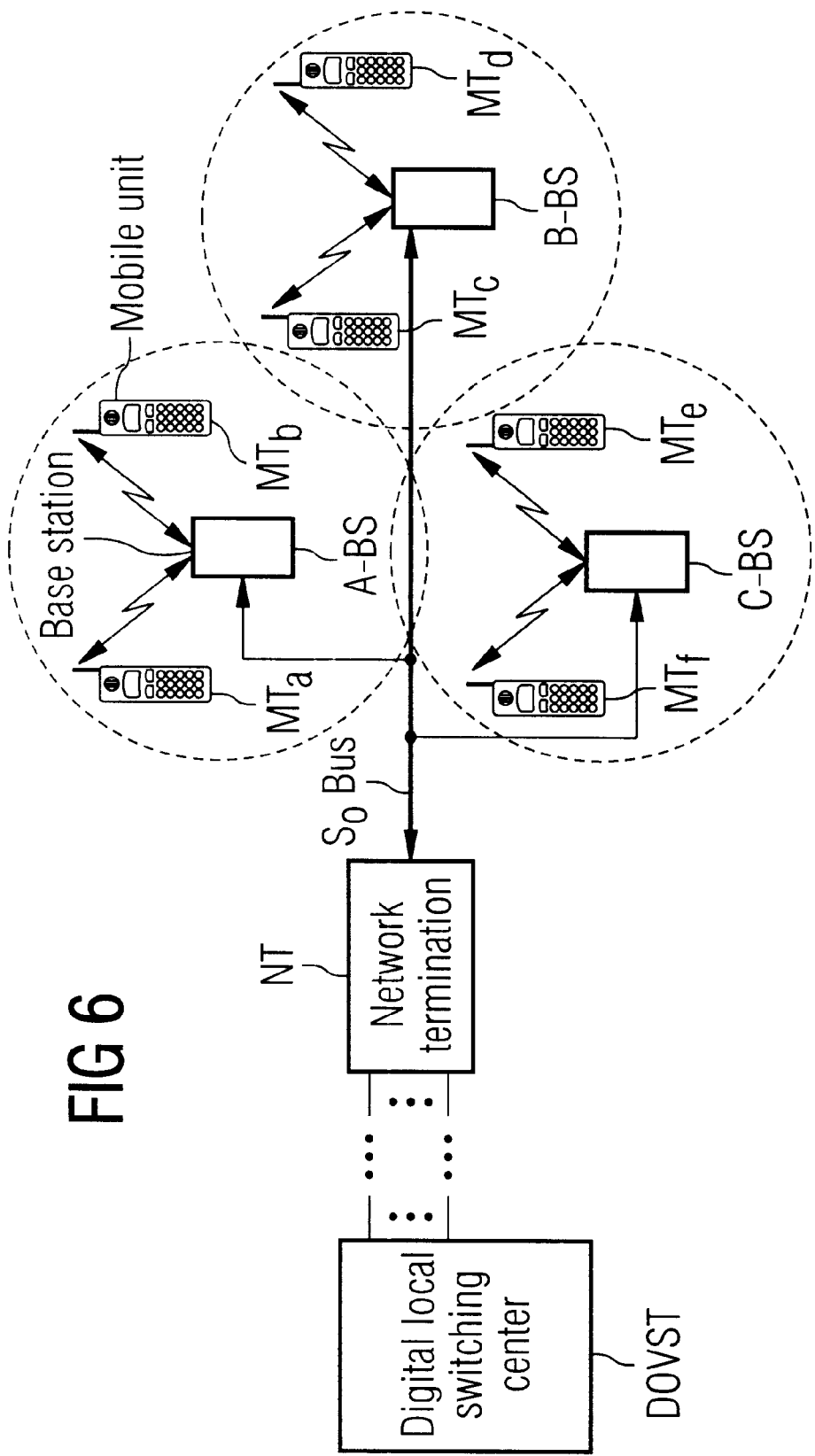
FIG. 6 depicts another multicell solution according to the present invention.

A first exemplary embodiment for achieving the "handover" and other performance features, such as roaming, hold, check-back etc., is explained on the basis of FIG. 1, with reference to FIGS. 5 and 6.

The use of digital cordless terminals in the form of a simple multi-cell solution is shown in the illustration in FIGS. 5 and 6.

FIG. 5 shows the connection of the cordless base stations via (a) the private branch exchange PABX (for example a HAKIM private branch exchange) having a plurality of $S_0$ bus connections and a network termination NT to a digital local switching center DOVST.

(b) The private branch exchange PABX (for example a HAKIM private branch exchange) having a plurality of $S_0$ bus connections to a digital local switching center DOVST.

FIG. 6 shows the connection of the cordless base stations via a network termination NT to a digital local switching center DOVST.

Each $S_0$ bus may have connected to it up to eight cordless base stations, which are distributed as favorably as possible to achieve area coverage within the radio area to be covered, taking account of the range of the $S_0$ bus (approx. 150 m).

In the Euro-ISDN Standard (cf. Nachrichtentechnik Elektronik [Electronic Information Technology] Berlin, 44 (1994) Issue 1, pages 16 to 18) it is generally possible—in the case of an $S_0$ bus connection via the MSN (Multiple Subscriber Number)—to allocate different telephone numbers to terminals connected to an $S_0$ bus. These telephone numbers for the individual units may either be completely different to one another or may comprise the last n digits of the telephone number, where n may be $\geq 1$. In this case, it is also possible to allocate a plurality of multiple subscriber numbers (MSN) to one terminal. Each connected base station can also be reached via a plurality of or all the existing multiple subscriber numbers (MSN). In addition, each base station knows all the terminal identifiers TEI (Terminal Endpoint Identifier) of the mobile units since all the mobile units have reported once, and are uniquely assigned to the various multiple subscriber numbers.

At the moment, the number of possible multiple subscriber numbers within DBP Telekom is initially limited to m=10 (NDL m=8). When connected to the Hakim private branch exchange (PABX), the mobile units can be reached via the direct-dialling number of the $S_0$ bus and a single-digit pseudo-MSN attached to it, only this last digit being passed to the bus and being evaluated there. In this case, "0" is in general reserved for selection of all the connected terminals, and the digits "1" to "8" are reserved for the individual terminals. If the system connection were to have more than one $S_0$ bus, a greater value for m would also be conceivable (for example 2 digits), since only the base stations evaluate the MSN. In this case, it would be necessary to ensure that the base stations can be set to the total number of MSNs allocated.

Roaming

A mobile terminal (cordless subscriber) may move freely within the network covered by radio cells and may both set up links and receive calls.

When an incoming call occurs, all the base stations evaluate the incoming MSN and transmit a call for the desired mobile unit with the corresponding terminal identifier TEI. The called mobile unit sets up the link to the strongest base station, which then carries out the call exclusively. In the case of an outgoing call, the best base station is chosen automatically by the mobile unit, and the link is set up via this base station.

In the case of a connection downstream of the Hakim private branch exchange (PABX) with more than one $S_0$ bus, all the base stations likewise receive signals for a mobile unit when an incoming call occurs (call allocation by means of the Hicom private branch exchange), and call the desired mobile unit. The first station to reach the mobile unit obtains the call. In this way, the mobile unit can also be localized in radio areas of different $S_0$ buses.

Handover

A manual handover between two radio cells can be carried out during a call (Intercell Handover) using the principle of bus changeover, by means of the performance feature TP (Terminal Portability). If it is found that the range has been exceeded by the mobile unit, the subscriber receives a warning signal, which requests him to take action. He sends a signal to the current base station, which in turn sends a request for the TP feature to the exchange (digital local switching center DOVST) or to the Hakim private branch exchange PABX. The mobile unit then sends a signal to the best base station for reception, which then accepts the call. The link is in this case transferred to the new base station without disconnecting the B channel. Depending on the time taken to change over between base stations, there may possibly be a brief interruption in the radio link during this process. In order to minimize the interruption time, the base stations should be operated synchronously. In the area where a plurality of radio cells overlap, continuous changeovers are suppressed by a sufficiently large amount of hysteresis.

Internal Links, Hold, Check-Back, Transfer

From the point of view of the exchange, there is no difference between an external link and an internal link. Internal links between different base station on a bus are thus possible only as an external link via the exchange. Internal links within the radio area of a base station are set up via this base station independently of the exchange.

A call-back from an active call can be carried out by initiating the Euro-ISDN performance feature CH (Call Hold) and then dialling the desired number ("external" or "internal"). The CH feature causes the current call to be held, irrespective of whether this is an incoming or outgoing call. The previously used B channel is in this case released for other actions by the initiating subscriber (receipt of incoming calls, setting up a further link), which also makes possible call-back or broker calls.

A transfer before or after a third terminal has reported is specified by the Euro-ISDN performance feature ECT (Explicit Call Transfer), but no date has yet been defined for the introduction of this performance feature. However, the preparation and implementation of this feature makes sense for future use.

Figure 7:
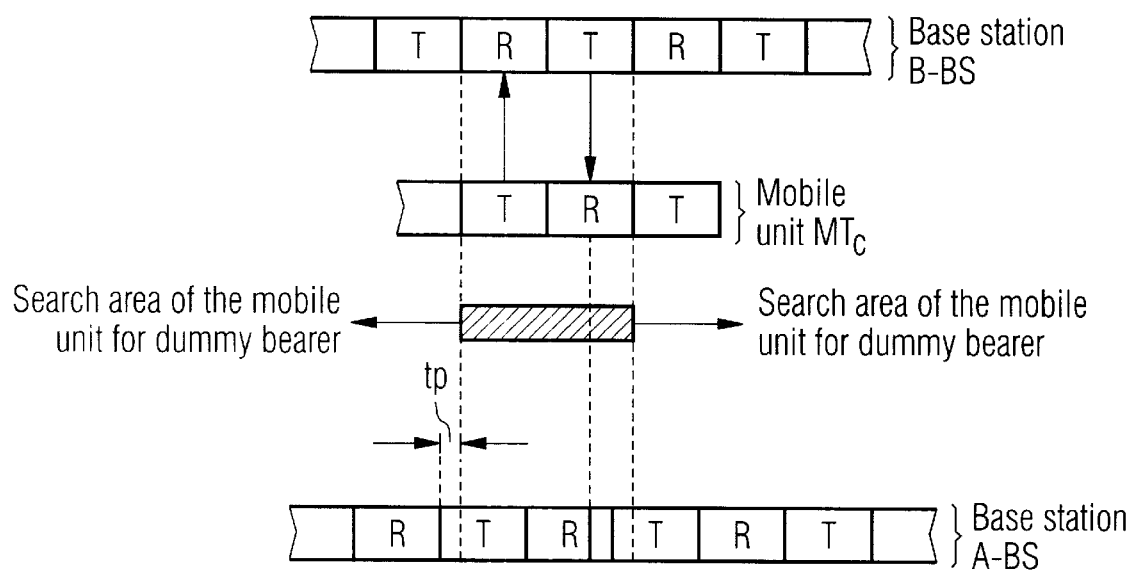
FIG. 7 depicts detection of all time-slots with the exception of one time-slot.
Figure 8:
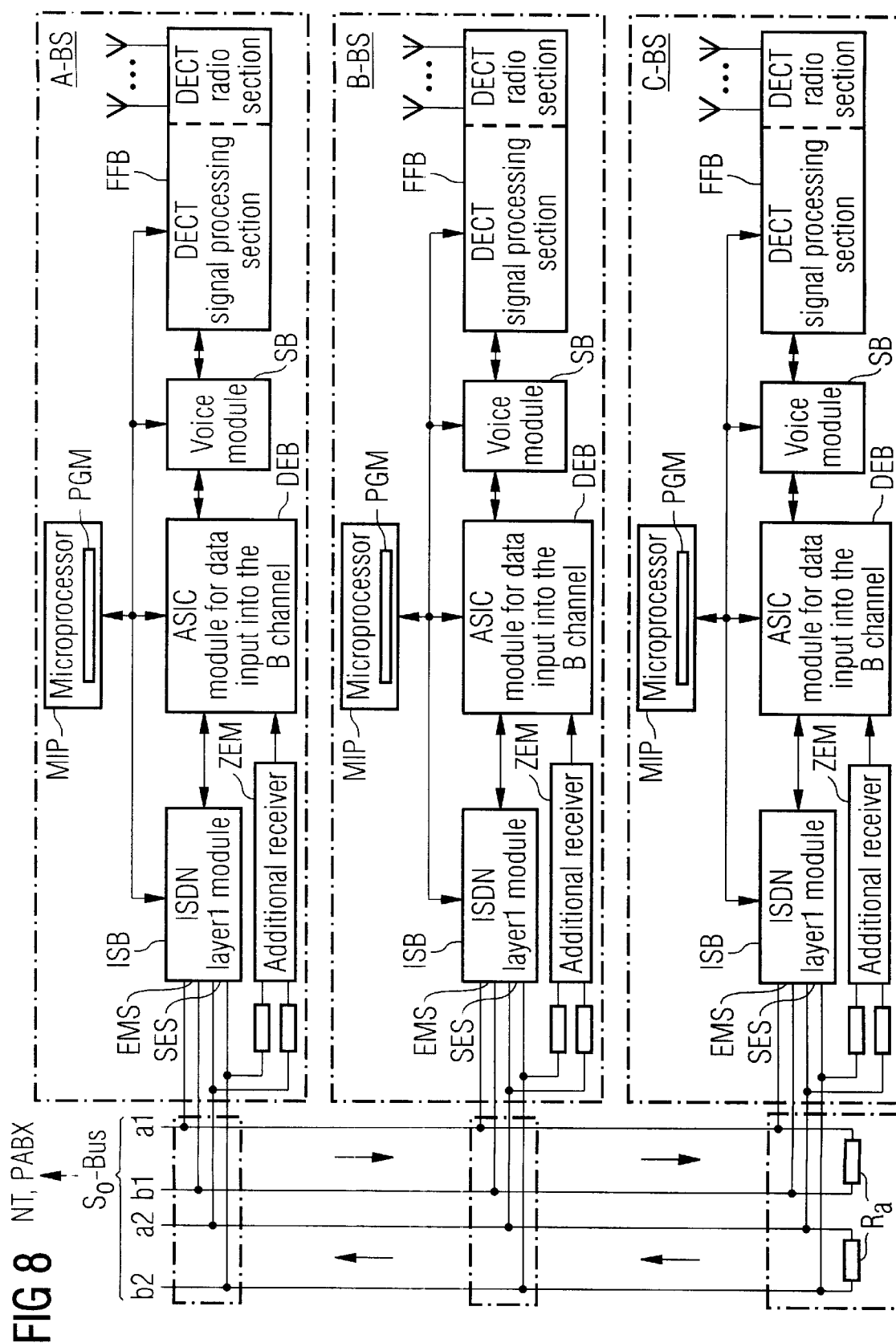
FIG. 8 depicts a system having an additional receiver.

A first exemplary embodiment for producing the synchronization between the base stations on the $S_0$ bus and a second exemplary embodiment for producing the "Handover" of the cordless telephones on the $S_0$ bus will be explained with reference to FIGS. 7 and 8 in conjunction with FIGS. 2 to 6.

A small multi-cell DECT cordless telecommunications system will be described, whose base stations are connected, as in the case of the first exemplary embodiment, by means of an ISDN $S_0$ bus. The system in this case offers an increase in range without any additional wiring and can pass on external calls virtually without any interruption when the user changes between radio cells (base stations). The area in which the radio fields of the base stations overlap need not include the base stations themselves. In addition, the number of mobile units in the entire telecommunications system is increased. There is no facility for passing on calls within the radio cell of a base station (internal link).

Sychronicity

The sychronicity of the base stations A-BS, B-BS, C-BS makes it possible for the mobile unit $MT_C$ to select the respective base station A-BS, B-BS, C-BS that is the best for a link in radio terms, while the existing link continues to be maintained and without any additional hardware complexity being required in the mobile unit $MT_C$. A change in the link can be prepared in the background, and can be carried out in a very short time. In a completely asynchronous system, after loss of a link, the mobile unit $MT_C$ would have to search virtually all the time slots (one time slot after the other) of the base stations A-BS, B-BS, C-BS arranged in the system.

Once the ISDN layer 1 has been set up for $S_0$ bus, the same reference clock is available to the base stations A-BS, B-BS, C-BS. This clock is admittedly subject to jitter (max.±7% of a bit period of 5.2 µs), but the long-term stability corresponds to that of the network mode (max.±$10^{-7}$ when the subscriber switching center is running freely; min.±$10^{-11}$ when the subscriber switching center is synchronized by the reference clock. A stuffing bit method allows the frame clock of the DECT system (slave) to be matched to the ISDN clock (master). A 10 ms frame is in this case lengthened or shortened by half a bit period (½×868 ns). The DECT frames of the base stations A-BS, B-BS, C-BS on the $S_0$ bus are now admittedly synchronized in terms of frequency, but their phases are undefined and may differ from one another by up to 5 ms (cf. FIG. 7). To compensate for this 5 ms by means of stuffing bits would require approx. 115 s. Once the ISDN layer 1 has been cleared, the oscillators in the base stations A-BS, B-BS, C-BS drift away from one another. If it is assumed that the stability can be improved by an order of magnitude from the 5 ppm required in the DECT specification (Standard) to 0.5 ppm by means of additional measures (for example by means of a digital temperature-compensated oscillator DTCXO), then the DECT stations A-BS, B-BS, C-BS would nevertheless become asynchronous after just 1.7 s. In this case, an offset of one bit is regarded as asynchronicity.

This shows that phase synchronicity between the DECT base stations A-BS, B-BS, C-BS that are part of the overall system can neither be achieved in a sufficiently short time just with the aid of the $S_0$ bus, nor can it be maintained for a significant time after the link has been broken.

If frequency synchronicity exists between the base stations A-BS, B-BS, C-BS, it is possible to dispense with synchronicity of the DECT frames, if the mobile section $MT_C$ searches for the dummy bearer (provided in the DECT standard) of another base station—in the present case the base station A-BS—for its full 10 ms time slot. As can be seen from FIG. 7, with the exception of one time slot, all the other time slots can be detected. The concealment of one time slot by one's own base station—in the present case the base station B-BS—is not important if the base stations A-BS, B-BS, C-BS that form part of the overall system change the timing of the dummy bearer on the basis of statistical viewpoints.

Data Transmission

The transmission of data between the DECT base stations A-BS, B-BS, C-BS is carried out using the last bit (LSB= Last Significant Bit) of an active B channel in accordance with the "bit stealing method". Based on FIG. 4, the base stations A-BS, B-BS, C-BS each have the circuit layout illustrated in principle in FIG. 8. The circuit layout in this case essentially comprises the following modules or functional blocks, a radio functional block comprising the DECT radio section and the DECT signal processing section FFB, a voice module SB, a module designed as an ASIC for data input to the B channel DEB, an ISDN layer 1 module ISB with a transmitting stage SES and a receiving stage EMS, as well as an additional receiver ZEM, which items are connected in series, in the stated sequence, between the antenna and the $S_0$ bus and are controlled by a microprocessor MIP. In an analogous manner to the microprocessor µP according to FIG. 4, the microprocessor MIP once again contains a program module PGM with the implementation of the ISO/OSI layer model.

For data transmission in accordance with the "bit stealing method" mentioned above, the transmitting station A-BS, B-BS, C-BS replaces the last bit (LSB) in a PCM octet by its signalling data. The other base stations A-BS, B-BS, C-BS, that form part of the overall system, receive this information via the additional receiver ZEM (FIG. 8), which is connected in parallel with its own $S_0$ transmitting stage SES, without contravening the specification of the ISDN layer 2 of the $S_0$ bus (FIG. 8). This method offers synchronous simplex data transmission at a maximum of 8000 bauds, which is purchased at the expense of a deterioration of the signal-to-noise ratio (theoretically by 6 dB) in the B channel. The interference on the voice link is kept within limits if, on the one hand, the data clock rate is reduced to, for example, 2000 bauds, that is to say only the last bit (LSB) of every fourth octet is now used. A transmission method similar to the HDLC method (High Data Link Control) is used. A data packet with a length of 64 bytes (8 bytes start flag, 52 bytes data, 2 bytes guard, 2 bytes stop flag) can be transmitted at 2000 bauds in 256 ms. This short transmission time has only a minor adverse effect on the subjective transmission quality in the B channel.

B Channel Connection

Setting up a Connection

The mobile unit $MT_C$ has "logged on" with the base station B-BS and sets up an external call with the B subscriber via the D channel of the base station B-BS. From the point of view of the switching center, the B channel via which the call is passed is allocated a specific TE number (TEI=Terminal Endpoint Identifier) of this $S_0$ bus. This allocation could be changed only by switching performance features (Terminal Portability; cf. first exemplary embodiment). The base station B-BS now uses B channel signalling to report the call data [TEI, RFPI (Radio Fixed Part Identity), IPUI International Portable User Identity), B channel etc.] to the other base stations A-BS, C-BS.

Passing on Calls

During the call, the mobile unit $MT_C$ searches in the background for the dummy bearer of the other base stations A-BS, C-BS that are part of the system. If the link to the base station B-BS is broken or one of the other base stations A-BS, C-BS offers better radio field links, then the mobile unit $MT_C$ "logs on" with this base station A-BS, C-BS. This base station A-BS, C-BS can use the previously transmitted data to reallocate its B channel to this mobile unit $MT_C$, and to connect it virtually without any delay. After loss of the mobile unit $MT_C$, the base station B-BS inhibits B channel access.

Clearing a Call

Mobile Unit Terminates

The terminate command is transmitted from the mobile unit $MT_C$ to the base station A-BS, C-BS, which in turn transmits this command by means of B channel data to the base station B-BS. The base station B-BS then terminates the link via the D channel. This action can also be read by the base station A-BS, C-BS using the known TE number of the base station B-BS, since the "release" of the connection is assessed as a command.

B Subscriber Terminates

The switching system uses the D channel procedure to clear the call link to the base station B-BS. This action can also be read by the base station A-BS, C-BS using the known TE number of the base station B-BS, since the "release" of the connection is assessed as a command.

Mobile Unit no Longer in the Radio Field

The base station B-BS does not receive any message from one of the other base stations A-BS, C-BS via the B channel signalling within a call acceptance waiting time, and clears the link.

Implementation Complexity

The ISDN layer 2 must be able to process three different TE numbers in the receiving direction. In the connected state, the mobile unit $MT_C$ must be able to search for other base stations. The analog section of the additional receiver ZEM may comprise a differential amplifier and a comparator. The rest of the signal processing is carried out digitally. Since critical tasks, such as the regeneration of the $S_0$ clock, are still derived from the ISDN layer 1 module ISB, which has an adaptive receiving stage, it should also be possible to achieve a range via the $S_0$ bus of 150 to 200 m, depending on the cable type, using this simple receiver. The major portion of the implementation is borne by the system software, so that the system can be manufactured cost-effectively.

Automatic Configuration

When setting up or, subsequently, expanding the overall system, a data interchange must take place between the base stations and mobile units (RFPI, IPUI, etc. in accordance with the DECT Standard). This effort and the possibility of errors linked to it can be reduced if the base stations in the system report these data, in the event of a change, via the B channel signalling to the base stations connected to the $S_0$ bus. These data can then be copied from the base stations to the mobile units. Thus, for configuration of the overall system (to be more precise: other base stations and mobile units logging on) it is sufficient for each base station to carry one external call.

Figure 9:
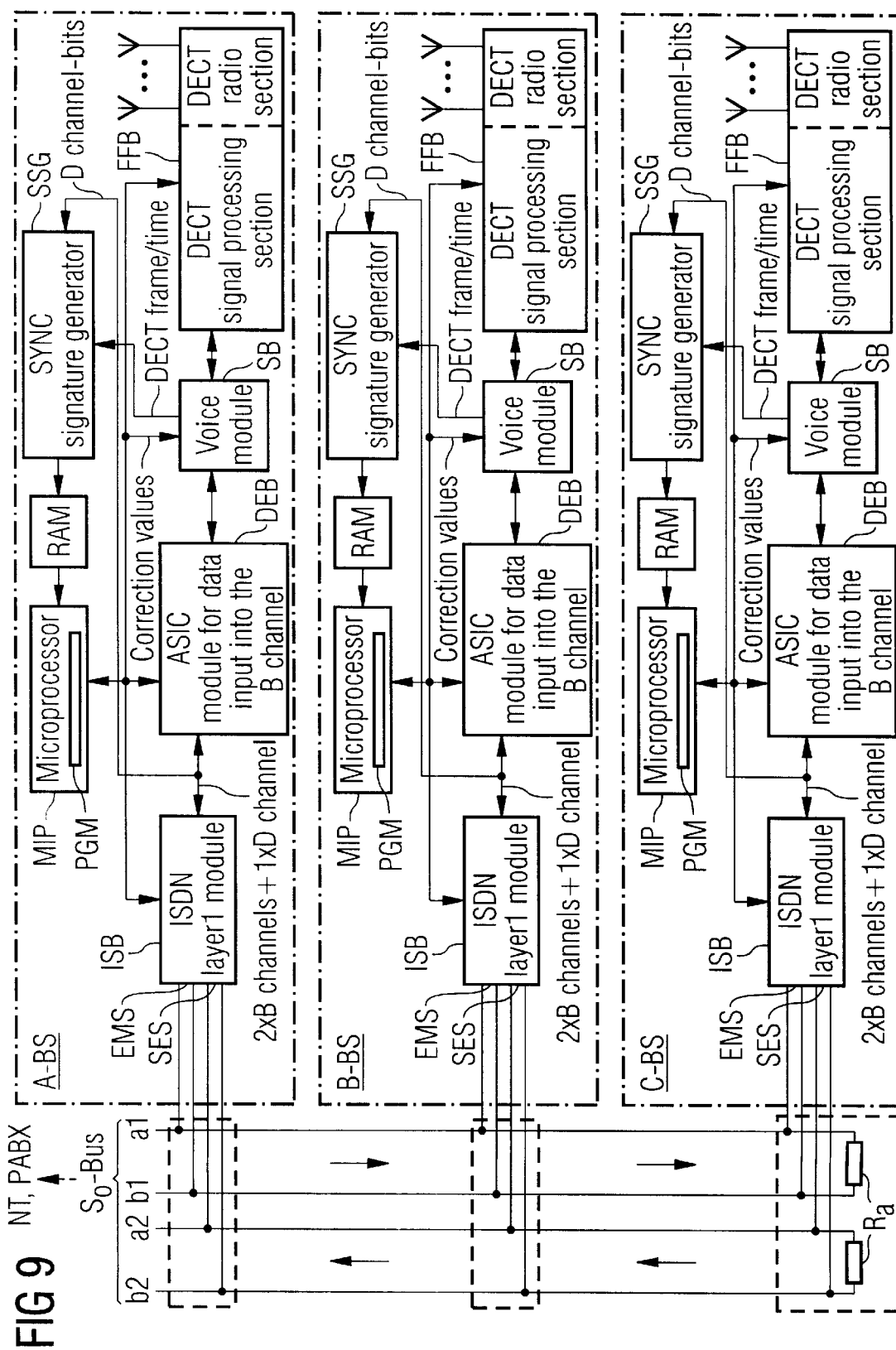
FIG. 9 depicts an embodiment for producing synchronization of the base stations to the $S_0$ bus.
Figure 10:
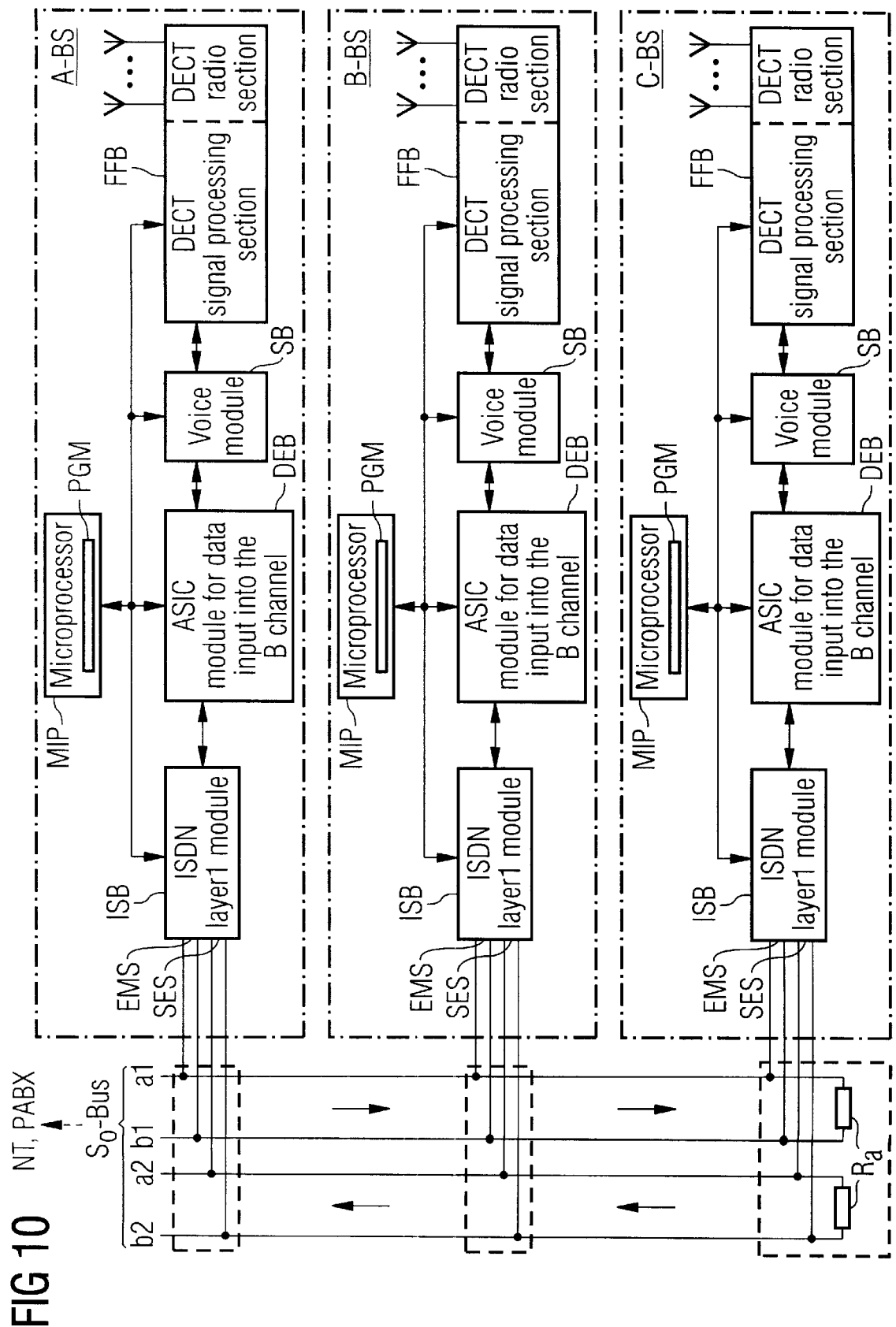
FIG. 10 depicts the system having modules or functional blocks.

A second exemplary embodiment for producing the synchronization of the base stations to the $S_0$ bus is explained with reference to FIG. 9 in conjunction with FIGS. 2 to 6.

The timing of the DECT system according to FIG. 1 with the base stations A-BS, B-BS, C-BS is structured by the 10 ms time frame ZR according to FIG. 4 and by the 160 ms multiple time frame MZR. If it is intended to transfer an existing RF link for one base station—for example the base station B-BS—to one of the other base stations A-BS, C-BS since, for example, the mobile unit $MT_C$ is leaving the radio area of the base station B-BS, it is necessary for the base stations A-BS, B-BS, C-BS to synchronize their clocks (frames) to one another.

By means of this measure, it is possible to transfer an RF link between base stations which have no radio link with one another, without there being any traceable disturbances for the user.

In the following text, it is assumed that the base stations A-BS, B-BS, C-BS are linked by a common ISDN $S_0$ bus, that the synchronization of the base stations A-BS, B-BS, C-BS is carried out via the $S_0$ bus, and that the base stations A-BS, B-BS, C-BS each, based on FIG. 4, have the circuit layout illustrated in principle in FIG. 9.

The circuit layout in this case essentially comprises the following modules or functional blocks, a radio functional block comprising a DECT radio section and a DECT signal processing section FFB, a voice module SB, a module designed as an ASIC for data input to the B channel DEB, an ISDN layer 1 module ISB with a transmitting stage SES and a receiving stage EMS, which items are connected in the stated sequence in series between the antenna and the $S_0$ bus are controlled by a microprocessor MIP. In an analogous manner to the microprocessor $\mu P$ according to FIG. 4, the microprocessor MIP once again contains a program module PGM with the implementation of the ISO/OSI layer model. Furthermore, a synchronization signature generator SSG (SYNC signature generator) and a memory module RAM are provided, which are connected in the stated sequence in series between the ISDN layer 1 module ISB and the microprocessor MIP.

Until now, the synchronization—as already mentioned at the start—has been achieved by separate wiring between the base stations.

After setting up the ISDN layer 1 in the ISDN layer 1 module ISB, the base stations A-BS, B-BS, C-BS monitor the D channel in the receiving direction [direction "network termination NT→terminal endpoint TE"]. Once a start flag (octet 01111110) has been identified, a 16-bit long CRC word (Cycle Redundancy Check) is formed from the 32 bits (or more) which now follow, without any further discrimination.

Furthermore, a counter is started at the start of a DECT multiple time frame MZR and, after the CRC word has been formed, is stopped and its count is read out.

In this way, a synchronization signature (synchronization signature=CRC word+count) is generated which links the DECT timing to the $S_0$ bus timing.

The synchronization signatures are produced and stored in the circular buffer RAM continuously, this circular buffer RAM representing a list (signature table) of the signatures, for example, in the last 5 seconds. This list is produced virtually synchronously in all the base stations A-BS, B-BS, C-BS, since the ISDN layer 1 is started up at the same time in all the base stations A-BS, B-BS, C-ES (terminal endpoints TE) (ISDN Standard).

In order to synchronize the base stations A-BS, B-BS, C-BS the last synchronization signature is transmitted by the B channel or as packet data in the D channel to the base station A-BS, B-BS, C-BS with a need for synchronization. The base station A-BS, B-BS, C-BS with the need for synchronization uses the 16-bit long CRC word in order to find the corresponding count in its list. The correction value for the DECT frame is obtained from the difference between its own counter and the transmitted value.

A third exemplary embodiment for implementation of the "handover" of cordless telephones to the $S_0$ bus and a third exemplary embodiment relating to the production of synchronization of the base stations on the $S_0$ bus are explained with reference to FIGS. 10 to 15.

I. Method for Controlling the Handover of Links by DECT Base Stations on the $S_0$ Bus General Problem Definition The configuration dealt with with the telecommunications network is as follows:

- The base stations A-BS, B-BS, C-BS between which the handover can take place are connected to the same $S_0$ bus of a basic access of the ISDN (Integrated Services Digital Network; cf. document "Nachrichtentechnik Electronik [Electronic Information Technology], Berlin 45, Part: 1 to 10, T1: (1991) Issue 3, pages 99 to 102; T2: (1991) Issue 4, pages 138 to 143; T3: (1991) Issue 5, pages 179 to 182 and Issue 6, pages 219 to 220; T4: (1991) Issue 6, pages 220 to 222 and (1992) Issue 1, pages 19 to 20; T5: (1992) Issue 2, pages 59 to 62 and (1992) Issue 3, pages 99 to 102; T6: (1992) Issue 4, pages 150 to 153; T7: (1992) Issue 6, pages 238 to 241; T8: (1993) Issue 1, pages 29 to 33; T9: (1993) Issue 2, pages 95 to 97 and (1993) Issue 3, pages 129 to 135; T10: (1993) Issue 4, pages 187 to 190;") (FIGS. 5 and 6).
- At the interface to the $S_0$ bus, the only basic functions assumed are those which are currently available on the interface and in the telecommunications network.
- Based on FIG. 4, the base stations A-BS, B-BS, C-BS each have the circuit layout illustrated in principle in FIG. 10. The circuit layout in this case essentially comprises the following modules or functional blocks, a radio functional block comprising a DECT radio section and a DECT signal processing section FFB, a voice module SB, a module designed as an ASIC for data input to the B channel DEB, as well as an ISDN layer 1 module ISB with a transmitting stage SES and a receiving stage EMS, which items are connected in the stated sequence in series between the antenna and the $S_0$ bus and are controlled by a microprocessor MIP. In an analogous manner to the microprocessor $\mu$P according to FIG. 4, the microprocessor MIP once again contains a program module PGM with the implementation of the ISO/OSI layer model.

The base stations A-BS, B-BS, C-BS can be connected to the $S_0$ bus in accordance with FIGS. 11 and 12 in a different manner, in particular on the basis of different architecture models. For example, with regard to FIG. 12 it can be said that:

1. Interface matching for processing E bits in such a manner that use by standard HDLC receivers (High Data Link Control) is possible [cf. FIG. 13 in conjunction with the document: Nachrichtentechnik Elektronik [Electronic Information Technology], Berlin; "Schnittstellen der Telekommunikation [Telecommunications interfaces]" Part 4; 41 (1991) Issue 6, pages 220 to 222 and 42 (1992), Issue 1, pages 19 and 20].

2. HDLC hardware function: at the receiving end with an interface via the microprocessor bus to the software element in the microprocessor.

3. Hardware upgrading for frame synchronization with defined real-time responses. In this case, it is also possible to go directly to the E bit. All the functions are handled without support from the microcontroller. The HDLC basic functions are essentially:
   HDLC frame synchronization
   masking out the insertion bits
   CRC handling
   SAPI/TEI evaluation [cf. FIG. 13 in conjunction with the document: Nachrichtentechnik Elektronik [Electronic Information Technology], Berlin; "Schnittstellen der Telekommunikation [Telecommunications interfaces]" Part 4; 41 (1991), Issue 6, pages 220 to 222 and 42 (1992), Issue 1, pages 19 and 20].
   if required, evaluation of the Info field [cf. FIG. 13 in conjunction with the document: Nachrichtentechnik Elektronik [Electronic Information Technology], Berlin; "Schnittstellen der Telekommunikation [Telecommunications interfaces]" Part 4; 41 (1991), Issue 6, pages 220 to 222 and 42 (1992), Issue 1, pages 19 and 20].

4. Layer 1 Functions
   The production of an additional signal T is feasible here, by means of which the layer 1 function reports that a D channel frame to be transmitted has gained access to the $S_0$ bus and is being transmitted. In this case, the identification and checking of the transmission of its own information is carried out by monitoring the E channel. This function could alternatively be set up directly on the E bit itself, and implemented in 1) and/or 3).

In the case of the configuration being considered, it is assumed that the DECT structure is maintained, including the handover function.

The handover function is one of the mobility functions in wire-free telecommunication. The following function is regarded as a "handover" here:

1) The mobile unit $MT_C$ moves during ongoing connection activities from the radio area of base station B-BS to the radio area of base station A-BS, where it continues the activities started with the base station B-BS, without any interruption.

2) In particular, the situation is covered in which the mobile unit $MT_C$ already has an active voice link, through the base station B-BS and via the telecommunications network, with a remote partner. It is assumed that the handover function is not initiated until this connection state is achieved and the mobile unit $MT_C$ is in the radio area of both base stations B-BS, A-BS during the handover process.

This means that the situation for the base stations B-BS, A-BS on the $S_0$ bus is as follows:

a) during the handover, the base station A-BS must be able to accept the ISDN layer 2 links and ISDN layer 3 links in existence between the base station B-BS and the telecommunications network, and must be able to continue them seamlessly. Base station A-BS must accept the current connection control process parameters in existence for the base station B-BS for this purpose.

b) the same applies to the DECT layer 3 link.

c) the base station A-BS must accept the existing wanted information channel (B channel). The changeover between the base station B-BS and the base station A-BS should take place with as little interruption and disturbance as possible.

d) it should also be possible to carry out the radio frame synchronization via the $S_0$ interface.

Note: This situation will be dealt with in more detail in the following text

II. Method for Frame Synchronization of the "Radio Interface" of DECT Base Stations Via the $S_0$ Bus of the ISDN Network Interface.

e) a transmission path between the base stations A-BS, B-BS for parameter transfer and coordination is required as a basis for the functions a)–d). In accordance with the preconditions, this path must have a local character within the bus itself, since new functions are not supported. Such local transmissions must have no disturbing effect in the network itself (compatibility with defined interface functions).

Solution Principles
Local Intercommunication

Figure 14:
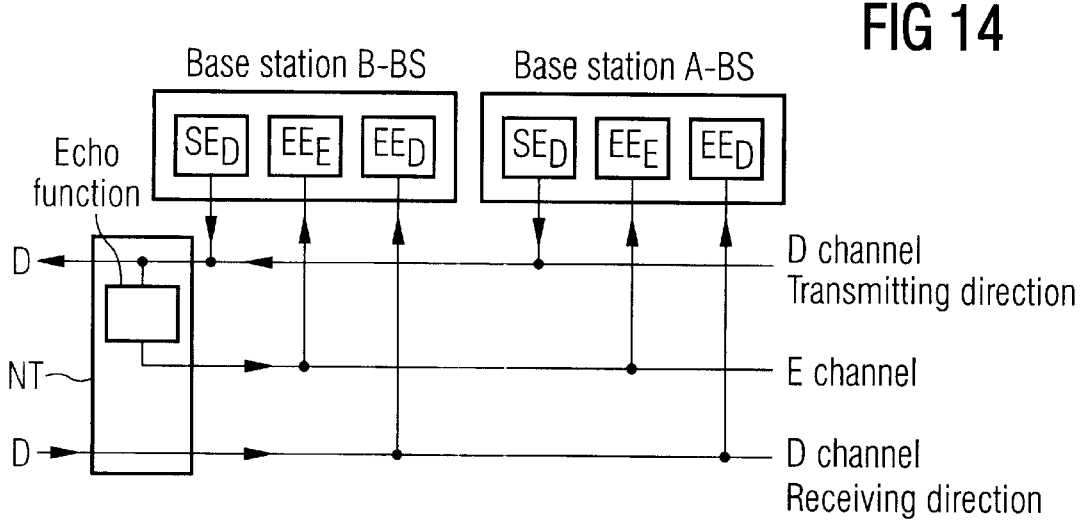
FIG. 14 depicts use of an information channel having a D-channel and an E-channel.
Figure 15:
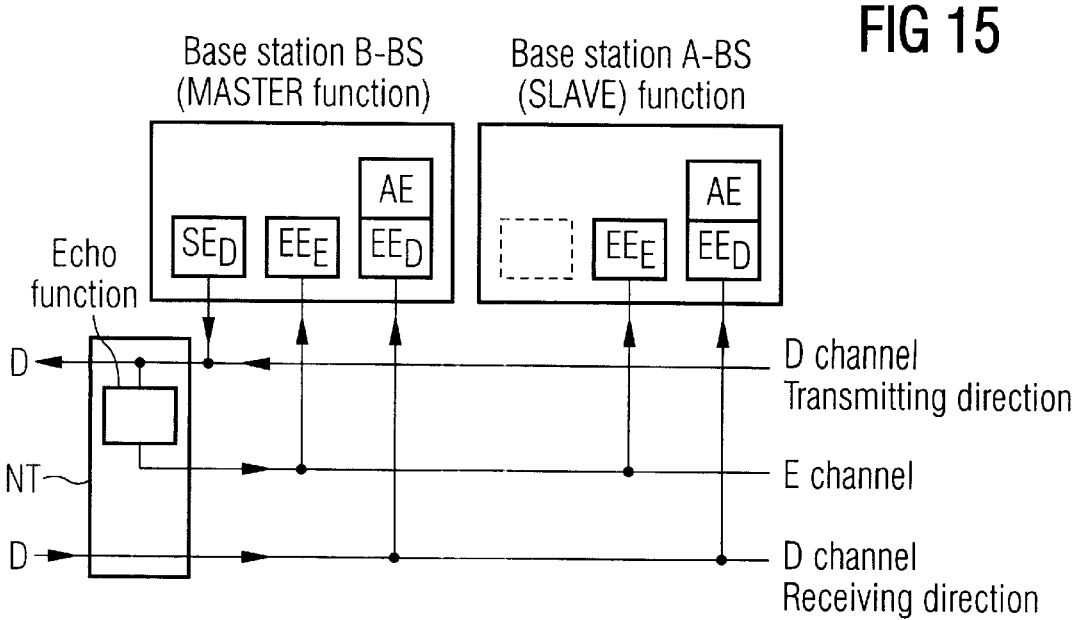
FIG. 15 depicts a master and slave relationship of the base stations.

According to FIG. 14, it is proposed that an information channel be used comprising the D channel (transmitting and receiving directions) and the E channel (Echo D channel) [cf. II. Method for frame synchronization of the "radio interface" of DECT base stations via the $S_0$ bus of the ISDN network interface]. This is also based on the increased usage capability mentioned there. The E channel is a channel on which the D channel information is transmitted, modified in the network termination NT by an echo function.

In addition to a transmitting device $SE_D$ and a receiving device $EE_D$ for the D channel, each base station A-BS, B-BS also has, on the E channel a receiving device $EE_E$ whose basic functions are identical to those of that on the D channel, that is to say complies with the normal format conventions in the HDLC protocols. FIG. 14 shows a basic circuit diagram of this configuration.

Format, addresses

Figure 13:
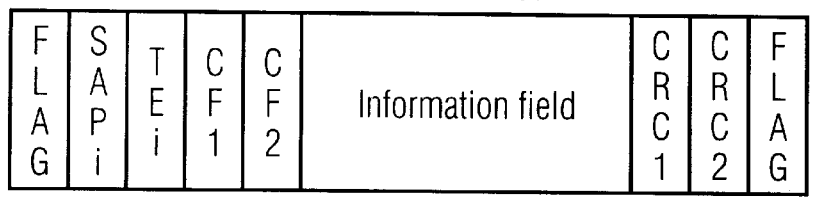
FIG. 13 depicts evaluation of an info field.

The basis for intercommunication is the "Unnumbered Information Frame" (UI frame) format in accordance with the conventions of the D channel layer 2 protocol (LAP-D) [cf. FIG. 13 in conjunction with the document: Nachrichtentechnik Elektronik [Electronic Information Technology], Berlin; "Schnittstellen der Telekommunkation [Telecommunications interfaces]" Part 4; 41 (1991), Issue 6, pages 220 to 222 and 42 (1992), Issue 1, pages 19 and 20].

SAPI (Service Access Point Identifier)
To be defined by Standardization Committees (e.g. ITU, ETSI) from the reserved area in Standards (must be compatible with the telecommunications network).

TEI (Terminal Endpoint Identifier): Value: 127 dec

Other application-specific addresses: in the data field of the UI frame. Thus, in principle, these can physically be transmitted to all base stations A-BS, B-BS, C-BS (broadcasting). Where necessary, selectivity can be designed on the basis of application-specific aspects.

Error protection, correction

Redundancy and error identification comply with the LAP-D (Link Access Procedure D-Channel) convention. Building on this, the method outlined below is proposed for error correction. Taking account of the local character of the transmission path in the $S_0$ bus, the following assumptions are made in this case:

The fact "Frame correctly/incorrectly received" is identified with the same meaning by all base stations A-BS, B-BS, C-BS.

From this, it follows that the base station A-BS, B-BS, C-BS respectively transmitting in the D channel can also itself identify the fact "correct/incorrect" in the E channel. If necessary, it can request that the transmission be repeated, without any explicit acknowledgement by the receiving base station being necessary. In order to identify such locally transmitted UI frames, the base stations A-BS, B-BS are therefore equipped in the D channel at the transmitting end with a device element which definitively identifies when such a UI frame has obtained access to the D channel and is being transmitted. Such a frame can thus be selectively filtered out of the sequence of all the frames transmitted in the D channel, and can be analyzed, in real-time conditions.

The transmit/receive timing is made possible by the given fixed bit offset in the echo function "D-channel→E channel".

Other functions

The receivers on the E channel can also be provided, in addition, with a device element which allows real-time analysis of the frame content while the bit stream is arriving. If a frame has been received without errors, switching criteria for shortest possible reactions are thus available immediately after the end of the frame. In order to shorten the reaction time for relatively long frames, it is also possible to provide section-by-section intermediate protection for the transmitting base station and the receiving base stations.

Method for Handover/Transfer of the Link

Building on the local intercommunication, the method contains the following procedure steps:

a) After identifying a handover request from the specific mobile unit $MT_C$ (identified by its identifier), the base station A-BS sends a message with the following content:
Sender: address A-BS
Receiver: all base stations
Command: handover request
$MT_C$ identity: it is assumed that the mobile unit $MT_C$ has only one link. If not, the links must also be identified.

The base station B-BS (which controls the link to the mobile unit $MT_C$) identifies the identity of the mobile unit $MT_C$.

b) The base station B-BS then passes all the current relevant parameters in a selective message to the base station A-BS, such as:
ISDN layer 2: TEI, sequence number variable, process state
ISDN layer 3: B channel, call reference, call state
DECT layer 3: transaction identification, call state c) After receipt, the base station A-BS installs correspondingly synchronous internal control processes and starts the analysis of protocol activities on the D channel and on the DECT interface. However, The base station A-BS initially still remains passive.

The base station A-BS confirms method step c) by a selective confirmation message to the base station B-BS.

d) Case branch:
d1) If, in the meantime, the base station B-BS has not received any protocol activity from the telecommunications network relating to this link or identifying the mobile unit $MT_C$, the transfer of the initiative for continuing the link is confirmed in a selective message to the base station A-BS.

d2) If, in the meantime, it is necessary because of TEI management actions to refresh the TEI for the ISDN layer 2 link and to set it up again, the base station B-BS carries out this action and cancels and updates the corresponding parameters in the base station A-BS in accordance with method step b).

Continuation: steps c), d1) etc.

d3) If, in the meantime, a different layer 2 information relating to this link is received in the D channel (which can also be identified by the base station A-BS as well), the base station B-BS reacts with method step d1). The base station A-BS then continues the procedure.

Note: It is assumed that the "base station B-BS→base station A-BS" handover can normally take place within the given monitoring times of ISDN layer 2. If not, once the timer has timed out, the telecommunications network reacts with corresponding "recovery procedures", within the course of which the handover must in all cases be definitively completed.

d4) If the mobile unit $MT_C$ terminates the link, the base station B-BS completes this action and cancels the handover process by a selective message to the base station A-BS.

d5) Handling of collisions

In principle, method step d1) can collide in terms of the detailed timing with activities such as those dealt with in method steps d2)–d4), since processes in the echo D channel can overlap in time with receiving processes in the D channel.

Conflicts are resolved as follows:

The base station B-BS becomes passive when the handover acknowledgement has been transferred to the base station A-BS for transmission in the D channel to the lower-level control complexes, even if the acknowledgement has not yet actually been transmitted or has not yet been transmitted completely. The base station A-BS does not become active until this acknowledgement has been correctly received.

The telecommunications network will repeatedly come up against outstanding layer 2 procedure steps in the course of the "layer 2 recovery procedures". It therefore appears that the delay time resulting from the handover latency cannot be bridged.

In the remaining exceptional cases, the link will be terminated.

Wanted Channel Changeover

The following items apply to the handover of use of the allocated B channel from the base station B-BS to the base station A-BS:

The changeover of the voice link should be as free of interruptions as possible, but a perceptible "click" appears acceptable.

If there is any overlap in the supply from the base station B-BS and the base station A-BS (in principle conceivable, since the B channel is known at an early stage by the base station A-BS), it is necessary to ensure that both base stations A-BS, B-BS arrange identical PCM words in identical B channel time slots. If this is not done, non-linear signal superimposition will occur, since a "0" on the $S_0$ bus physically overwrites a "1". This can lead to a disturbance, in particular over a number of $S_0$ frames, which may be less acceptable than a brief interruption.

The options are as follows:

a) The base station B-BS switches off when the acknowledgement is prepared (method step d1), and the base station A-BS switches on on receipt of this acknowledgement. The resulting interruption time is composed of: acknowledgement waiting time for bus access, transmission time, reaction time by the base station A-BS.

b) The base station B-BS does not switch off until it has identified the end of error-free transmission of this acknowledgement on the E channel. The only remaining latency time is then the reaction time by the base station A-BS.

II. Method for Frame Synchronization of the "Radio Interface" of DECT Base Stations via the $S_0$ Bus of the ISDN Network Interface Wire-free, cell-oriented telecommunications systems such as DECT systems operate on the following principle:

within a radio cell, the base station defines on the "radio interface" to the mobile stations communicating with it the time-division multiplex frame and thus the relative timing of the time slots which are allocated in a link-specific manner to the information interchange in the frequency bands. With regard to the frame clock cycle phase used in operation, the base stations are in principle independent of one another.

Mutual synchronization is not precluded. The methods which can be chosen are left to the specific applications.

Frame synchronization of the radio interfaces of different base stations may be necessary for the following reasons:

i) In areas where adjacent radio cells overlap, the capability to reuse adjacent time slots within a frequency band may be adversely affected, or even precluded, unless there is a common frame clock phase.

ii) Essential precondition for a low-complexity solution: Interruption-free transfer of an existing link in the event of a physical change between adjacent, mutually overlapping radio cells.

For global communication, local DECT systems are connected via the base station to higher-level telecommunications networks such as the PSTN or ISDN (Integrated Services Digital Network; cf. document "Nachrichtentechnik Elektronik [Electronic Information Technology], Berlin 45, Part: 1 to 10, T1: (1991) Issue 3, pages 99 to 102; T2: (1991) Issue 4, pages 138 to 143; T3: (1991) Issue 5, pages 179 to 182 and Issue 6, pages 219 to 220; T4: (1991) Issue 6, pages 220 to 222 and (1992) Issue 1, pages 19 to 20; T5: (1992) Issue 2, pages 59 to 62 and (1992) Issue 3, pages 99 to 102; T6: (1992) Issue 4, pages 150 to 153; T7: (1992) Issue 6, pages 238 to 241; T8: (1993) Issue 1, pages 29 to 33; T9: (1993) Issue 2, pages 95 to 97 and (1993) Issue 3, pages 129 to 135; T10: (1993) Issue 4, pages 187 to 190;"), or to comparable private networks. If synchronization is necessary, it is evident in the concept for the specified interface to the network to be included as far as possible. With regard to solutions of this type, it can be stated in principle that the compatibility with the interface and with the system functions based on it must still be ensured.

The following text describes a method by means of which radio frame synchronization is possible by base stations which are connected, for example, locally to the $S_0$ bus of an ISDN basic access.

The fundamental preconditions for synchronization are:

a) It must be possible for a transmitted trigger signal for synchronization to be received and evaluated by all the stations in a time window which is generally very constricted.

b) All stations must react to the identified trigger signal within a closely constrained time window.

The basic functions of the $S_0$ bus include a function which satisfies aspect a) and with regard to which it is supposed here that, in principle, it should also quantitatively satisfy the specific requirements of the synchronization problem under consideration here, in terms of the time window.

The $S_0$ bus includes an echo function as the basis for coordination of accesses by connected stations to the D channel. Network termination NT provides the transition between 4-wire operation on the $S_0$ bus and 2-wire operation on the connecting line into the telecommunications network, and returns each bit which has been received from an equipment (base station) in the D channel as, inter alia, a so-called E bit in the E channel to the equipment (base stations).

$S_0$ far as is known and integrated in commercially available components, this function is now used internally exclusively for this access control in layer 1 hardware close to the interface and, with certain exceptions, is not accessible for other additional applications.

The delay in the signal path between transmission of a bit in the D channel and its reception as an echo in the E channel of the $S_0$ bus corresponds to the time for 2 bits (approx. 10 $\mu$s). This delay can also be compensated for in the present applicaton [see items a) and b)].

Radio Frame Synchronization

1) Building on this function at the interface, radio frame synchronization can be carried out as follows (FIG. 15):

a) One base station, for example the base station A-BS, of the base stations A-BS, B-BS, C-BS connected to the $S_0$ bus, is assigned the MASTER function, while all the other base stations B-BS, C-BS are assigned the SLAVE function.

b) The MASTER function essentially consists of having to initiate synchronization. The technical means used for this purpose may be the same as those which are already present for normal use at the transmitting end of the D channel. According to FIG. 15, this is the transmitting device $SE_D$. The base station A-BS also contains the receiving device $EE_E$ on the E channel and the receiving device $EE_D$ on the D channel. In contrast to the D channel receiver $EE_D$, the E channel receiver $EE_E$ also has an evaluation device AE. The technical design of the receiver and the evaluation device must take account of the aspect of "time window for synchronization". The receiver and evaluation device sample the bit stream in the E channel, identify the synchronization block in it in "real time", and use this to derive the internal trigger signal. They preferably comprise, for example, the combination of a serial/parallel converter, octet counter and decoder (building on the basic octet structure of the D channel protocol). The receiver on the E channel may also be equipped with all the function elements of the receiver on the D channel. Building on this, all the stations connected to the $S_0$ bus can interchange information with one another locally via the "D channel→E channel" path.

c) The base station B-BS contains the receiving device $EE_E$ on the E channel and the receiving device $EE_D$ on the D channel. The transmitting device $SE_D$ which the base station A-BS also contains for the D channel is not required for the SLAVE function assigned to the base station. In contrast to the D channel receiver $EE_D$, the E channel receiver $EE_E$ once again contains the evaluation device AE. The technical design of the receiver and evaluation device must once again take account of the aspect of "time window for synchronization". The receiver and evaluation device sample the bit stream in the E channel, identify the synchronization block in it in "real time" and derive the internal trigger signal from it. They preferably comprise, for example, the combination of a serial/parallel converter, octet counter and decoder (building on the basic octet structure of the D channel protocol). The receiver on the E channel may also be equipped with all the function elements of the receiver on the D channel. Building on this, all the stations connected to the $S_0$ bus can interchange information with one another locally via the "D channel→E channel" path.

d) The base station A-BS (MASTER station) transmits an arranged synchronization message in the outgoing D channel.

Note: This must be compatible with the network since it is also received by the telecommunications network.

e) The synchronization message is reflected by the network termination NT and is then received in the E channel and evaluated within the time window of all the other base stations B-BS, C-BS (SLAVE stations).

f) All the base stations A-BS, B-BS, C-BS then start to transmit the radio frames, whose mutual phases must then be within the acceptable tolerance range.

g) The MASTER station may also itself evaluate the synchronization signal sent to it in the E channel. It can then repeatedly initiate the process for identified malfunctions. In addition, this allows the "D channel→E channel" time delay to be eliminated.

h) Continuously repeating the trigger process at relatively long time intervals under some circumstances allows base stations which have become desynchronized to be resynchronized.

2) Alternative Approaches

The $S_0$ bus frame format also contains other bits which, hypothetically, can be used for reflection by the network termination NT. However, the major disadvantages in comparison with the "D channel→E channel" path are as follows:

i) Reflection by the network termination NT has not yet been anchored in the basic functions.

ii) Some of the bits in question are used for network-specific purposes.

The E channel does not have disadvantage i). Under some circumstances, disadvantage ii) can occur in the E channel if the E bit were used in a similar form for other purposes.

Synchronization Message and Synchronization Signal

Since the D channel is used for transmitting the synchronization message from the base station A-BS (MASTER station), the synchronization signal must also satisfy the basic conventions for the layer 2 message frame.

It is proposed that a so-called UI frame (Unnumbered Information) in the D channel layer 2 protocol (LAP-D) be used here [cf. FIG. 13 in conjunction with the document: "Nachrichtentechnik Electronik [Electronic Information Technology]", Berlin; "Schnittstellen der Telekommunikation [Telecommunications interfaces]" Part 4; 41 (1991), Issue 6, pages 220 to 222 and 42 (1992), Issue 1, pages 19 and 20], which is essentially characterized by an SAPI octet (Service Access Point Identifier), that is still to be defined.

The SAPI code must be defined by the responsible international Standardization Institutions ETSI and ITU (previously CCITT) from the currently reserved range of values.

In principle, an application-specific SAPI value could be defined. Alternatively, such a value could be defined for local applications, for example such as those above. In the latter case, the discrimination from other applications can be be carried out in accordance with known methods within the data field.

The layer 2 convention allows a data field to have a maximum of 260 octets. The synchronization signal can thus occupy a time period of up to approx. 130 ms, that is to say a large number of radio frames. One possibility for use as the initiating trigger time, whose timing is highly constrained, is the end of the layer 2 frame in which the synchronization was previously activated, or other agreed octets or bits in the data field.

It appears to be unnecessary to evaluate the transmitted data protection information at the receiving end in the E channel since the $S_0$ bus itself may be regarded as suffciently operationally reliable, and no procedural measures apart from "co-reading" by the MASTER station and its reaction are envisaged.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A cellular cordless telecommunications system comprising:

(a) a large number of cordless base stations which are arranged in radio cells in the cellular cordless telecommunications system and are connected to a wire-based switching center for intercellular telecommunications or telecommunications between cells;

(a1) the switching center having at least one $S_0$ interface for a basic access multi-device line $S_0$; and (a2) each of the cordless base stations having link means for producing an intercellular telecommunications link or a telecommunications link between cells with an $S_0$ transmitting stage constructed in accordance with a ISO/OSI layer model and with an $S_0$ receiving stage in accordance with the ISO/OSI (International Organization of Standardization/Open Standardization/Open System Interconnection) layer model, the transmitting and receiving stages being connected to the $S_0$ interface via an $S_0$ bus having two B channels and one D channel;

(b) at least one cordless mobile unit which telecommunicates with the cordless base stations;

(c) the cordless base stations, in a master-slave configuration having a master cordless base station and at least one slave cordless base station connected to the $S_0$ interface of the switching center;

(d) the master cordless base station and the at least one slave cordless base station being structured in terms of the link means such that, once a layer 1 of the $S_0$ transmitting stage and of the $S_0$ receiving stage has been set up in accordance with the ISO/OSI layer model, a synchronization message is transmitted between the cordless base stations connected to the $S_0$ interface, on the $S_0$ bus from the master cordless base station to the at least one slave cordless base station.

2. The cellular cordless telecommunications system as claimed in claim 1, wherein the link means of the slave cordless base stations are structured such that a received synchronization message is evaluated, and the slave cordless base station being one of abruptly synchronized or continuously synchronized to the master cordless base station, after this evaluation.

3. The cellular cordless telecommunications system as claimed in claim 1, wherein the master cordless base station of the cordless base stations connected to the $S_0$ interface is that for which further layers of the $S_0$ transmitting stage and of the $S_0$ receiving stage are set up first in accordance with the ISO/OSI layer model.

4. The cellular cordless telecommunications system as claimed in claims 1, wherein the master cordless base station is structured in terms of the link means such that the synchronization message transmitted by the master cordless base station is also received and evaluated by the master cordless base station.

5. The cellular cordless telecommunications system as claimed in claim 1, wherein the synchronization message is transmitted in the D channel of the $S_0$ bus and subsequently, in accordance with an echo function implemented in the $S_0$ interface, in an E channel.

6. The cellular cordless telecommunications system as claimed in claim 5, wherein the synchronization message is contained in the data field of a data frame in accordance with a LAP-D (Link Access Procedure D-Channel) protocol.

7. The cellular cordless telecommunications system as claimed in claim 1, wherein the synchronization message is transmitted in the B channel of the $S_0$ bus, which B channel is used for intercellular telecommunications or telecommunications between cells, in that wanted data transmitted in the B channel is replaced to a predetermined extent by the synchronization message.

8. The cellular cordless telecommunications system as claimed in claim 7, wherein the wanted data transmitted in the B channel is replaced by the synchronization message to an extent that transmission quality in the B channel is reduced only insignificantly by a reduction in a signal-to-noise ratio in the B channel.

9. The cellular cordless telecommunications system as claimed in claim 8, wherein each last bit of every fourth PCM octet of the wanted data transmitted in the B channel is replaced by the synchronization message.

10. The cellular cordless telecommunications system as claimed in claim 1, wherein the synchronization message is transmitted in the D channel of the $S_0$ bus in packet data form.

11. The cellular cordless telecommunications system as claimed in claim 10, wherein synchronization message is transmitted in the B channel in a data packet which, in terms of packet structure, is similar to an HDLC (High Data Link Control) data packet.

12. The cellular cordless telecommunications system as claimed in claim 7, wherein the means have a receiving device which is connected to the $S_0$ bus in parallel with an $S_0$ transmitting stage.

13. The cellular cordless telecommunications system as claimed in claim 1, wherein the link means for reception and for evaluation of the transmitted synchronization message are structured such that the synchronization message is identified and a trigger signal is derived from the synchronization message in substantially real time.

14. The cellular cordless telecommunications system as claimed in claim 1, wherein the link means are structured such that, for each cordless base station connected to the $S_0$ interface, once or continuously, (a) a first data set is identified which initiates transmission of a data frame in accordance with a LAP-D (Link Access Procedure D-Channel) protocol;

(b) a bus-related data word is produced from a second data set in data frame, following the first data set, in accordance with a predetermined generation rule which is predetermined in a standard manner for all the cordless base stations;

(c) a base-station-specific time interval between a starting time of a radio time frame which occurs cyclically for channel related cordless transmission in a radio cell and a time of production of a bus-related data word is detected in a base-station-specific, radio-related data word form, (d) a base-station-specific synchronization signature is formed from the bus-related data word and from the base-station-specific, radio-related data word, is stored and links $S_0$ bus timing to a base-station-specific radio timing.

15. The cellular cordless telecommunications system as claimed in claim 14, wherein the generation rule is based on polynomial division used to form CRC values.

16. The cellular cordless telecommunications system as claimed in claim 14, wherein the synchronization message is formed as a master synchronization signature, which corresponds to a synchronization signature of the master cordless base station.

17. The cellular cordless telecommunications system as claimed in claim 16, wherein the link means for producing the intercellular telecommunications link are structured such that (a) a radio-related master data word which is transmitted with the received master synchronization signature is compared with the corresponding radio-related data word stored in the receiving slave cordless base station; and (b) if a difference is found between the data word to be compared, the starting time of the radio time frame indicated by the radio-related data word of the receiving slave cordless based station is corrected in a corresponding manner to the difference found.

18. The cellular cordless telecommunications system as claimed in claim 1, wherein the switching center is structured according to a Euro-ISDN (Euro-Integrated Services Digital Network) Standard.

19. The cellular cordless telecommunications system as claimed in claim 18, wherein (a) the cordless base stations in a master-slave configuration having a master cordless base station and at least one slave cordless base station, are connected to the $S_0$ interface of the switching center, a first radio link being set up between the master cordless base station and a first cordless mobile unit during intercellular telecommunications or telecommunications between cells;

(b) the first cordless mobile unit is structured such that a second radio link to a second cordless base station is set up in the background and is useable as a telecommunications link during the intercellular telecommunications or telecommunications between cells;

(c) the switching center has a service feature "terminal portability";

(d) the ink means for producing the intercellular telecommunications link or telecommunications link between cells as well as the switching center are structured such that, if radio quality of the second radio link is better than or equal to radio quality of the first radio link, the service feature "terminal portability", which is available in the switching center, is utilized such that the second radio link serves as a new telecommunications link during the intercellular telecommunications or telecommunications between cells.

20. The cellular cordless telecommunications system as claimed in claim 1, wherein (a) the cordless base stations in a master-slave configuration having a master cordless base station and at least one slave cordless base station, are connected to the $S_0$ interface of the switching center, a first radio link being set up between the master cordless station and the first cordless mobile unit during intercellular telecommunications or telecommunications between cells;

(b) the first cordless mobile unit is structured such that a second radio link to the second cordless base station is set up in the background and is useable as a telecommunications link during the intercellular telecommunications or telecommunications between cells;

(c) the master cordless base station and the at least one slave cordless base station are structured in terms of the link means such that a handover-relevant message is transmitted local intercommunication between the cordless base stations connected to the $S_0$ interface, on the $S_0$ bus from the master cordless base station to the at least one slave cordless base station.

21. The cellular cordless telecommunications system as claimed in claim 20, wherein the master cordless base station is structured in terms of the link means such that the message transmitted by the master cordless base station is also received and evaluated by the master cordless base station.

22. The cellular cordless telecommunications system as claimed in claim 1, wherein the link means have a receiving device which is connected to the $S_0$ bus in parallel with an $S_0$ transmitting stage.

23. The cellular cordless telecommunications system as claimed in claim 20, wherein the message is transmitted in the D channel of the $S_0$ bus and subsequently, in accordance with an echo function implemented in the $S_0$ interface, in an E channel.

24. The cellular cordless telecommunications system as claimed in claim 23, wherein the message is contained in a data field of a data frame in accordance with a LAP-D (Link Access Procedure D-Channel) protocol.

25. The cellular cordless telecommunications system as claimed in claim 20, wherein the message is transmitted in the B channel of the $S_0$ bus, which B channel is used for intercellular telecommunications or telecommunications between cells, in that wanted data transmitted in the B channel is replaced to a predetermined extent by the message.

26. The cellular cordless telecommunications system as claimed in claim 25, wherein the wanted data transmitted in the B channel is replaced by the message to an extent that transmission quality in the B channel is reduced only insignificantly by a reduction in signal-to-noise ratio in the B channel.

27. The cellular cordless telecommunications system as claimed in claim 26, wherein a last bit of every fourth PCM (Pulse Code Modulation) octet of the wanted data transmitted in the B channel is replaced by the message.

28. The cellular cordless telecommunications system as claimed in claim 25, wherein the message is transmitted in the B channel in a data packet which, in terms of the packet structure, is similar to an HDLC data packet.

29. The cellular cordless telecommunications system as claimed in claim 20, wherein the message is transmitted in the D channel of the $S_0$ bus in the packet data form.

30. The cellular cordless telecommunications system as claimed in claim 20, wherein the link means for reception and for evaluation of the transmitted message are structured such that handover-relevant information transmitted with the message is identified, and is used for virtually interruption-free handover, in substantially real time.

31. The cellular cordless telecommunications system as claimed in claim 30, wherein the handover relevant information contains telecommunications-specific identifiers.

32. The cellular cordless telecommunications system as claimed in claim 1, wherein the switching center is a digital local switching center with an upstream network termination.

33. The cellular cordless telecommunications system as claimed in claim 1, wherein the switching center is a private branch exchange.

34. The cellular cordless telecommunication system as claimed in claim 1, wherein the system further comprises a cordless base station having link means for producing an intercellular telecommunications link or a telecommunications link between cells, having an $S_0$ transmitting stage structured in accordance with the ISO/OSI layer model, and having an $S_0$ receiving stage in accordance with the ISO/OSI layer model, which stages are connectable to an $S_0$ interface of the switching center via an $S_0$ bus having two B channels and one D channel.

35. A cellular cordless telecommunications system, comprising:

(a) a large number of cordless base stations which are arranged in radio cells in the cellular cordless telecommunications system and are connected to a wire-based switching center for intercellular telecommunications or telecommunications between cells;

(a1) the switching center having at least one $S_0$ interface; and (a2) each of the cordless base stations having link means for producing an intercellular telecommunications link or a telecommunications link between cells with an $S_0$ transmitting stage constructed in accordance with a ISO/OSI layer model and with an $S_0$ receiving stage in accordance with the ISO/OSI layer model, transmitting and receiving stages being connected to the $S_0$ interface via an $S_0$ bus having two B channels and one D channel;

(b) at least one cordless mobile unit which telecommunicates with the cordless base stations;

(c) the switching center structured according to a Euro-ISDN Standard;

(d) the cordless base stations in a master-slave configuration having a master cordless base station and at least one slave cordless base station, connected to the $S_0$ interface of the switching center, a first radio link being set up between the master cordless base station and a first cordless mobile unit as a telecommunications link during intercellular telecommunications or telecommunications between cells;

(e) the first cordless mobile unit structured such that a second radio link to a second cordless base station is set up in the background and is useable as a telecommunications link during the intercellular telecommunications or telecommunications between cells;

(f) the switching center having a service feature "terminal portability";

(g) the link means for producing the intercellular telecommunications link or telecommunications link between cells as well as the switching center structured such that, if radio quality of the second radio link is better than or equal to radio quality of the first radio link, the service feature "terminal portability", which is available in the switching center, is utilized such that the second radio link serves as a new telecommunications link during the intercellular telecommunications or telecommunications between cells.

36. The cellular cordless telecommunication system as claimed in claim 35, wherein the system further comprises a cordless base station having link means for producing an intercellular telecommunications link or a telecommunications link between cells, having an $S_0$ transmitting stage structured in accordance with the ISO/OSI layer model, and having an $S_0$ receiving stage in accordance with the ISO/OSI layer model, which stages are connectable to an $S_0$ interface of the switching center via an $S_0$ bus having two B channels and one D channel.

37. The cellular cordless telecommunications system as claimed in claim 35, wherein the switching center is a digital local switching center with an upstream network termination.

38. The cellular cordless telecommunications system as claimed in claim 35, wherein the switching center is a private branch exchange.

39. A cellular cordless telecommunications system comprising:

(a) a large number of cordless base stations which are arranged in radio cells in the cellular cordless telecommunications system and are connected to a wire-based switching center for intercellular telecommunications or telecommunications between cells;

(a1) the switching center having at least one $S_0$ interface for a basic access multi-device line $S_0$; and (a2) each of the cordless base stations having link means for producing an intercellular telecommunications link or a telecommunications link between cells with an $S_0$ transmitting stage constructed in accordance with a ISO/OSI layer model and with an $S_0$ receiving stage in accordance with the ISO/OSI (International Organization of Standardization/Open Standardization/Open System Interconnection) layer model, the transmitting and receiving stages being connected to the $S_0$ interface via an $S_0$ bus having two B channels and one D channel;

(b) at least one cordless mobile unit which is capable of telecommunications with the cordless base stations;

(c) the cordless base stations in a master-slave configuration having a master cordless base station and at least one slave cordless base station connected to the $S_0$ interface of the switching center, a first radio link being set up between the master cordless base station and a first cordless mobile unit in the course of intercellular telecommunications or telecommunications between cells;

(d) the first cordless mobile unit structured such that a second radio link to a second cordless base station is set up in the background and is utilized as a telecommunications link during the intercellular telecommunications or telecommunications between cells;

(e) the master cordless base station and the at least one slave cordless base station being structured in terms of the link means such that a handover-relevant message is transmitted during local intercommunication between the cordless base stations connected to the $S_0$ interface, on the $S_0$ bus from the master cordless base station to the at least one slave cordless base station.

40. The cellular cordless telecommunication system as claimed in claim 39, wherein the system further comprises a cordless base station having link means for producing an intercellular telecommunications link or a telecommunications link between cells, having an $S_0$ transmitting stage structured in accordance with the ISO/OSI layer model, and having an $S_0$ receiving stage in accordance with the ISO/OSI layer model, which stages are connectable to an $S_0$ interface of the switching center via an $S_0$ bus having two B channels and one D channel.

41. The cellular cordless telecommunications system as claimed in claim 39, wherein the switching center is a digital local switching center with an upstream network termination.

42. The cellular cordless telecommunications system as claimed in claim 39, wherein the switching center is a private branch exchange.

* * * * *